US012041411B2

(12) United States Patent
Wei

(10) Patent No.: US 12,041,411 B2
(45) Date of Patent: Jul. 16, 2024

(54) MICRO-SPEAKER HAVING DIAPHRAGM PLATE(S) CAPABLE OF MOVING WITH RESPECT TO A HOUSING

(71) Applicant: GUOGUANG ELECTRIC CORP. LTD, Guangzhou (CN)

(72) Inventor: George Shaolin Wei, San Diego, CA (US)

(73) Assignee: Guoguang Electric Corp. Ltd, Guangzhou (CN)

(*) Notice: Subject to any disclaimer, the term of this patent is extended or adjusted under 35 U.S.C. 154(b) by 0 days.

(21) Appl. No.: 17/326,195

(22) Filed: May 20, 2021

(65) Prior Publication Data

US 2022/0377452 A1 Nov. 24, 2022

(51) Int. Cl.

*H04R 1/26* (2006.01)
*H04R 1/02* (2006.01)
*H04R 7/12* (2006.01)
*H04R 9/06* (2006.01)
*H04R 9/02* (2006.01)

(52) U.S. Cl.

CPC ............... *H04R 1/26* (2013.01); *H04R 1/025* (2013.01); *H04R 7/12* (2013.01); *H04R 9/06* (2013.01); *H04R 9/025* (2013.01); *H04R 2499/11* (2013.01)

(58) Field of Classification Search

CPC . H04R 1/26; H04R 1/025; H04R 1/28; H04R 1/02; H04R 1/00; H04R 1/24; H04R 7/12; H04R 7/045; H04R 7/04; H04R 7/16; H04R 7/18; H04R 7/20; H04R 7/24; H04R 9/00; H04R 9/025; H04R 9/06; H04R 2499/11; H04R 5/02; H04R 11/00; H04R 11/02; H04R 2440/05; H04R 2440/07

USPC .................. 381/335, 87, 162, 182, 185, 186

See application file for complete search history.

(56) References Cited

U.S. PATENT DOCUMENTS

| | | | | | |
|---|---|---|---|---|---|
| 1,273,459 | A | | 7/1918 | Chudzikowski | |
| 1,885,308 | A | * | 11/1932 | Thomas | H04R 7/00<br>381/186 |
| 3,015,366 | A | | 1/1962 | Bishop | |
| 3,873,784 | A | * | 3/1975 | Doschek | H04R 9/047<br>381/186 |
| 4,039,044 | A | | 8/1977 | Heil | |

(Continued)

*Primary Examiner* — Ahmad F. Matar
*Assistant Examiner* — Sabrina Diaz
(74) *Attorney, Agent, or Firm* — Julio Loza; LOZA & LOZA, LLP

(57) ABSTRACT

A speaker is provided. The speaker includes a housing. The speaker also includes a first diaphragm plate positioned within the housing and comprising a first driving device forming an exterior surface of the first diaphragm plate. The speaker further includes a second diaphragm plate positioned within the housing and comprising a second driving device forming an exterior surface of the second diaphragm plate. In addition, the speaker includes an insert plate fixedly attached to the housing and positioned between the first diaphragm plate and the second diaphragm plate. The insert plate includes an insert plate driving device positioned adjacent the first driving device and the second driving device. The insert plate driving device is configured to interact with the first driving device to move the first diaphragm plate relative to the housing and interact with the second driving device to move the second diaphragm plate relative to the housing.

20 Claims, 10 Drawing Sheets

(56) References Cited

U.S. PATENT DOCUMENTS

| | | | | |
|---|---|---|---|---|
| 4,160,883 | A | 7/1979 | Heil | |
| 8,897,472 | B2 | 11/2014 | Unruh et al. | |
| 2016/0212546 | A1* | 7/2016 | Salvatti | H04R 9/06 |

* cited by examiner

MICRO-SPEAKER HAVING DIAPHRAGM PLATE(S) CAPABLE OF MOVING WITH RESPECT TO A HOUSING

TECHNICAL FIELD

The technology discussed below relates generally to audio and acoustic devices, and more particularly, to a micro-speaker.

BACKGROUND

For speakers, the ability of a transducer to generate sound is related to volume displacement. The volume displacement of a transducer with a diaphragm is a product of the effective surface area of the diaphragm and the oscillation capability of that diaphragm. The greater the volume displacement of a transducer, the greater the potential of the transducer for generating sound. However, when the surface area of the diaphragm is relatively small, the speaker may have low electro-acoustic conversion efficiency and low sound pressure levels.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some aspects, a speaker is provided. The speaker includes a housing. The speaker also includes a first diaphragm plate positioned within the housing and comprising a first driving device forming an exterior surface of the first diaphragm plate. The speaker further includes a second diaphragm plate positioned within the housing and comprising a second driving device forming an exterior surface of the second diaphragm plate. In addition, the speaker includes an insert plate fixedly attached to the housing and positioned between the first diaphragm plate and the second diaphragm plate. The insert plate includes an insert plate driving device positioned adjacent the first driving device and the second driving device. The insert plate driving device is configured to interact with the first driving device to move the first diaphragm plate relative to the housing and interact with the second driving device to move the second diaphragm plate relative to the housing.

In some aspects, the first driving device may include a first transducer. The second driving device may include a second transducer. The insert plate driving device may include a coil insert. In some aspects, in response to receiving an electrical current, the coil insert may be configured to interact with at least one of the first transducer to move the first diaphragm plate relative to the housing or the second transducer to move the second diaphragm plate relative to the housing.

In some aspects, the first driving device may include a first coil insert. The second driving device may include a second coil insert. The insert plate driving device may include a transducer. In some aspects, in response to receiving an electrical current, the first coil insert is configured to interact with the transducer to move the first diaphragm plate relative to the housing. In some aspects, in response to receiving an electrical current, the second coil insert is configured to interact with the transducer to move the second diaphragm plate relative to the housing in response to receiving an electrical current.

In some aspects, the housing may further include a first aperture positioned through a first surface of the housing and in fluid communication with each of the first diaphragm plate, the second diaphragm plate, and insert plate. Additionally, in some aspects, the housing may further include a second aperture positioned through a second surface of the housing and in fluid communication with first diaphragm plate. Additionally, in some aspects, the housing may further include a third aperture positioned through the second surface of the housing and in fluid communication with the second diaphragm plate. In some aspects, the first surface of the housing and the second surface of the housing may include parallel surfaces.

In some aspects, a speaker is provided. The speaker includes a rectangular housing. The speaker also includes a diaphragm plate. The diaphragm plate includes a first flexible member coupled to a first interior surface of the rectangular housing. The diaphragm plate also includes a second flexible member coupled to a second interior surface of the rectangular housing. The first interior surface of the rectangular housing faces the second interior surface of the rectangular housing. The diaphragm plate further includes a driving device forming an exterior surface of the diaphragm plate. The speaker further includes an insert plate fixedly attached to the rectangular housing. The insert plate includes an insert plate driving device positioned adjacent the driving device and configured to cause the diaphragm plate to move relative to the rectangular housing in response to at least one of the driving device or the insert plate driving device receiving an electrical current.

In some aspects, the driving device may include a transducer and the insert plate driving device may include a coil. The coil may be configured to cause the diaphragm plate to move relative to the rectangular housing in response to receiving the electrical current. The driving device may include a coil and the insert plate driving device may include a transducer. The coil may be configured to cause the diaphragm plate to move relative to the rectangular housing in response to receiving the electrical current. The first flexible member coupled to the first interior surface and the second flexible member coupled to the second interior surface may each be configured to permit movement of the diaphragm plate along a direction parallel with the first interior surface the second interior surface. The first flexible member coupled to the first interior surface and the second flexible member coupled to the second interior surface may each be configured to dampen movement of the diaphragm plate along one or more directions that are not parallel to the first interior surface and the second interior surface.

In some aspects, a speaker is provided. The speaker includes a housing. The speaker also includes a diaphragm plate having a front face, a back face, and a perimeter face. The diaphragm plate includes a first length of the perimeter face positioned adjacent a first section of an interior surface of the housing and coupled to the first section of the interior surface of the housing via a flexible member. The diaphragm plate also includes a second length of the perimeter face positioned adjacent a second section of the interior surface of the housing and separated from the second section of the interior surface of the housing via a gap. The speaker further includes an insert plate fixedly attached to the housing. The insert plate includes an insert plate driving device positioned adjacent the driving device and configured to cause the diaphragm plate to move relative to the housing in response to at least one of the driving device or the insert plate driving receiving an electrical current.

In some aspects, the diaphragm plate may further include a third length of the perimeter face positioned adjacent a third section of an interior surface of the housing and coupled to the third section of the interior surface of the housing via another flexible member and a fourth length of the perimeter face positioned adjacent a fourth section of the interior surface of the housing and separated from the fourth section of the interior surface of the housing via another gap. The first length of the perimeter face, the second length of the perimeter face, the third length of the perimeter face, and the fourth length of the perimeter face may include an entire length of the perimeter face.

In some aspects, the housing may include a rectangular housing. The front face and the back face of the diaphragm plate may include a rectangle shape. In some aspects, the driving device may include a transducer and the insert plate driving device comprises a coil. The coil may be configured to cause the diaphragm plate to move relative to the housing in response to receiving the electrical current. In some aspects, the driving device may include a coil and the insert plate driving device may include a transducer. The coil may be configured to cause the diaphragm plate to move relative to the housing in response to receiving the electrical current. In some aspects, the flexible member coupling the first length of the perimeter face of the diaphragm plate to the first section of the interior surface of the housing may be configured to permit movement of the diaphragm plate along a direction parallel with the interior surface of the housing.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some examples, a diaphragm of a traditional microspeaker may be directly coupled to the air connected to its surface. the ability of a transducer to generate sound is related to volume displacement. The volume displacement of a transducer with a diaphragm is a product of the effective surface area of the diaphragm and the oscillation capability of that diaphragm. The greater the volume displacement of a transducer, the greater the potential of the transducer for generating sound. However, when the surface area of the diaphragm is relatively small, the speaker may have low electro-acoustic conversion efficiency and low sound pressure levels. A working principle of a speaker may include that when an audio signal acts on a first end and a second end of a voice coil, the voice coil is moved by a Lorentz force in the gap of the magnetic circuit to produce sound.

Figure 1B:
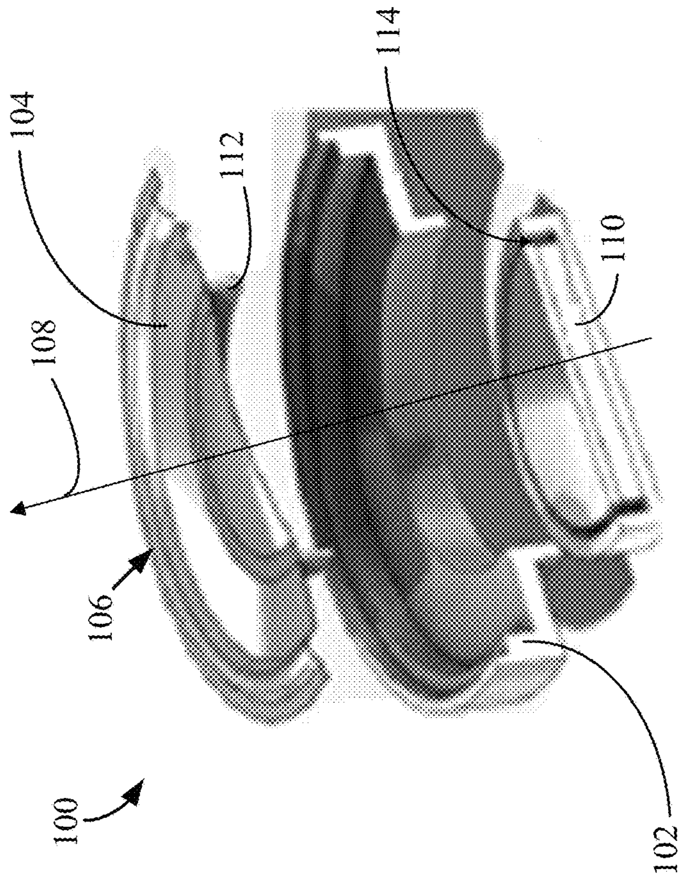
FIG. 1B is an exploded view of a speaker according to some aspects.
Figure 1A:
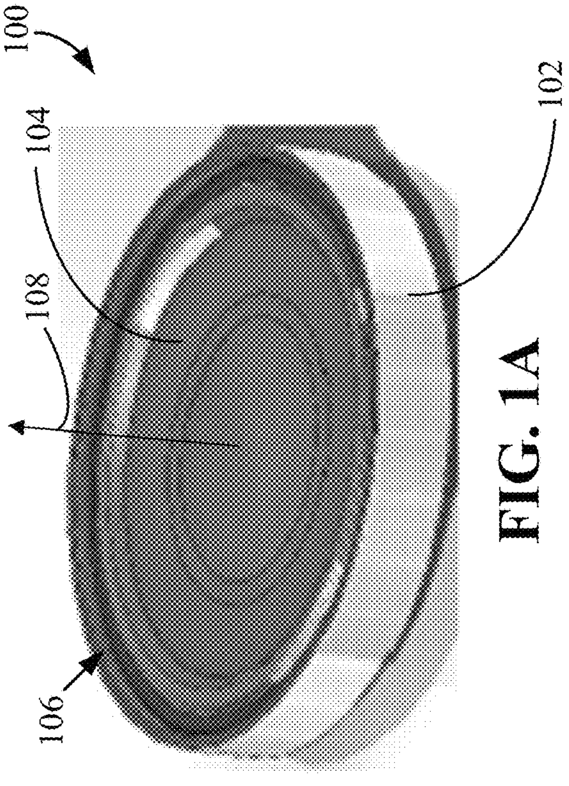
FIG. 1A is a perspective view of a speaker according to some aspects.

FIG. 1A is a perspective view of a speaker 100 according to some aspects. As shown in FIG. 1A, the speaker 100 may generally include a housing 102, a diaphragm 104, and a flexible member 106 (e.g., a surround). The flexible member 106 may couple a perimeter of the diaphragm 104 to the housing 102. For example, as shown in FIG. 1A, the flexible member 106 may couple an entire perimeter of the diaphragm 104 to the housing 102. The flexible member 106 may be a material that elastically bends, flexes, extends, and/or compress during movement of the diaphragm 104. In some examples, the flexible member 106 may be a non-gas permeable material or a gas permeable material. Upon activation of the speaker 100, the diaphragm 104 may move along a central axis 108 of the housing 102 under the constraints of the flexible member 106. The flexible member 106 may permit some movement of the diaphragm upon activation such as a movement along the central axis 108. The flexible member 106 may also prevent some movement of the diaphragm 104 such as movement away from the central axis 108 and/or displacement of the diaphragm 104 along the central axis 107 that is beyond a threshold displacement. The flexible member 106 may also cause the diaphragm 104 to return to a resting location within the housing 102 when the speaker 100 is no longer activated.

In some aspects, the flexible member 106 may not be as capable of effectively pushing air as the diaphragm 104 during activation of the speaker 100. Thus, the lesser the surface area between the housing 102 and the diaphragm 104 that is occupied by the flexible member 106, the more effective the diaphragm 104 is at pushing air and generating sound. Often the flexible member 106 may occupy a relatively large portion of the surface area between the housing

102 and the diaphragm 104. Thus, when the speaker 100 is activated causing the diaphragm 104 to move and push air to generate sound, the flexible member 106 may also move to retain the diaphragm 104 to the housing 102. However, because the flexible member 106 is not as capable of effectively pushing air as the diaphragm 104 to generate sound during activation of the speaker 100, the surface area occupied by the flexible member 106 may reduce the effectiveness of the speaker 100 to produce sound.

FIG. 1B is an exploded view of the speaker 100 according to some aspects, As shown in FIG. 1B, the speaker 100 includes the housing 102, the diaphragm 104, and the flexible member 106. In some aspects, the speaker 100 also includes a magnetic circuit 110 (e.g., a permanent magnet) and an electric coil 112 (e.g., a voice coil). The magnetic circuit 110 generally rests at the base of the housing 102. The electric coil 112 is fixed to the diaphragm 104 and rests in a gap 114 of the magnetic circuit 110. When the electric coil 112 receives an electric current, the electric coil 112 resting in the gap 114 (e.g., a resting location) of the magnetic circuit 110 moves away from a floor of the gap 114 and oscillates through the gap 114 along the central axis 108. With the electric coil 112 fixedly attached to the diaphragm 104, the oscillation of the electric coil 112 causes movement of the diaphragm 104 pushing air and generating sound. Parameters associated with the electric current such as the direction of the current through the electric coil 112, a magnitude of the voltage carried in the current, the magnitude of the current, a frequency of the current, and/or other similar parameters may affect movement of the electric circuit and the diaphragm (e.g., speed, displacement, and frequency) to generate an appropriate sound.

Figure 2:
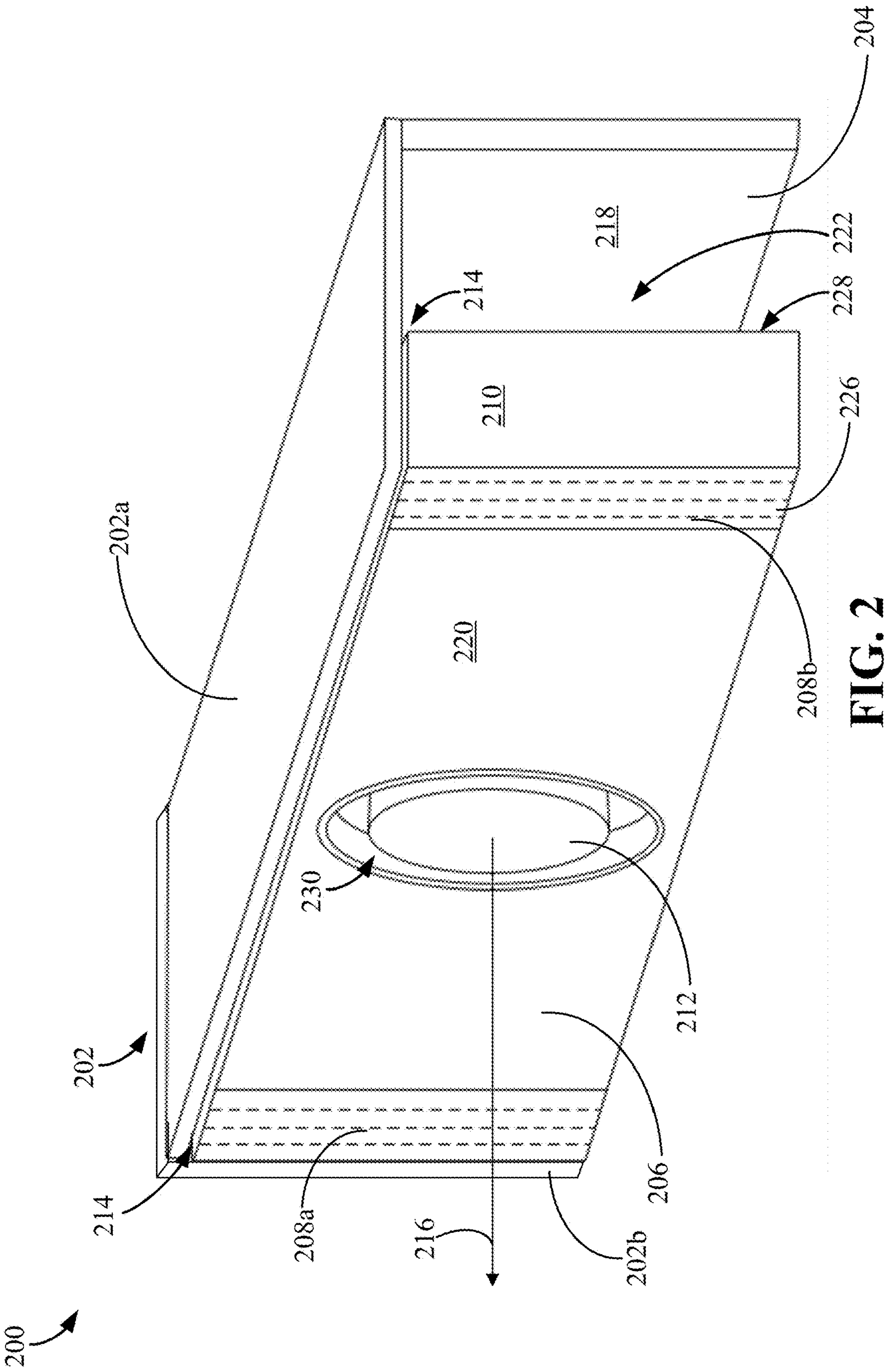
FIG. 2 is a perspective view of a cross-section of a speaker according to some aspects.

FIG. 2 is a perspective view of a cross-section of a speaker 200 according to some aspects. The speaker 200 may include one or more features illustrated in and described with respect to FIG. 1A and FIG. 1B. As shown in FIG. 2, the speaker 200 may include a housing 202, an insert plate 204, and a diaphragm plate 206. The housing 202 may include one or more plates for at least partially enclosing the insert plate 204 and the diaphragm plate 206. For example, the housing 202 may include a top housing plate 202*a* and a side housing plate 202*b*. In some examples, the housing 202 may additionally include another side housing plate positioned on an opposite side of the speaker 200 from the side housing plate 202*b*. It should be understood that while the speaker 200 including the housing 202, the insert plate 204, and the diaphragm plate 206 illustrated in FIG. 2 have a rectangular shape, the speaker 200 and one or more of its components may include a triangular shape, a circular shape, an elliptical shape, and/or any other polygonal shape. In some aspects, the size of the speaker 200 may be used for a small electronic device including a handset or a mobile cellular device.

The insert plate 204 may be fixedly attached to the housing 202. For example, the insert plate 204 may be fixedly attached to the housing at the top housing plate 202*a* and/or the side housing plate 202*b*. Additionally, or alternatively, the insert plate 204 may be fixedly attached to the housing 202 at another side housing plate positioned on an opposite side of the speaker 200 from the side housing plate 202*b*. As described herein, the insert plate 204 may include an electric coil (e.g., a voice coil) extending from a surface 218 of the insert plate 204 and towards the diaphragm plate 206.

The diaphragm plate 206 may be positioned adjacent the insert plate 204 and may be separated a distance from the insert plate 204 to accommodate one or more dimensions of the electric coil. The diaphragm plate 206 may include at least a front surface 220 and a back surface 222 (opposite the front surface 220) that are perpendicular or nearly perpendicular to the central axis 216 of the housing 202. The front surface 220 and the back surface 222 of the diaphragm plate 206 are configured to push and/or pull air when moved along the central axis 216 of the housing 202 generating sound. The greater a cross-sectional surface area of the front surface 220 and/or the back surface 222 of the diaphragm plate 206, the greater the amount of air the diaphragm plate 206 can push and/or pull to generate sound. Thus, a diaphragm plate 206 with a front surface 220 and/or a back surface 222 with a cross-sectional surface area that occupies a larger percentage of the interior cross-sectional area of the housing 202 may be more efficient at generating sound compared to a diaphragm plate 206 with a front surface 220 and/or a back surface 222 with a cross-sectional surface area that occupies a smaller percentage of the interior cross-sectional area of the housing 202.

In some aspects, one or more flexible members may be fixedly attached to the diaphragm plate 206. The one or more flexible members may be positioned around a portion (e.g., a length) of the perimeter of the diaphragm plate 206 and coupled to one or more surfaces of the diaphragm plate 206 that are parallel or substantially parallel with the central axis 216 of the housing 202. In some aspects, the one or more flexible members may be positioned around a portion of the perimeter of the diaphragm plate 206 that is not an entire perimeter (e.g., an entire perimeter length) of the diaphragm plate 206. In some cases, the one or more flexible members may be positioned anywhere along the perimeter of the diaphragm plate 206. In some cases, when the one or more flexible members includes a plurality of flexible members, each flexible member of the plurality of flexible members may occupy varying lengths of the perimeter of the diaphragm plate 206 or same equal portions of a length of the perimeter of the diaphragm plate 206.

As another example, as illustrated in FIG. 2, a first flexible member 208*a* and a second flexible member 208*b* may be fixedly attached to the diaphragm plate 206. The first flexible member 208*a* may be positioned along a first side of the diaphragm plate 206 and may couple the diaphragm plate 206 to the side housing plate 202*b* via a side surface of the first flexible member 208*a*. The second flexible member 208 may be positioned along a second side of the diaphragm plate 206 and may couple the diaphragm plate 206 to the other side housing plate described herein via the second side surface 210. Each of the first flexible member 208*a* and/or the second flexible member 208*b* may be a material that elastically bends, flexes, extends, and/or compress during movement of the diaphragm plate 206. In some examples, each of the first flexible member 208*a* and/or the second flexible member 208*b* may be a non-gas permeable material or a gas-permeable material.

Upon activation of the speaker 200, the diaphragm plate 206 may move relative to the housing and along a central axis 216 of the housing 202 under the constraints of the first flexible member 208*a* and/or the second flexible member 208*b*. Each of the first flexible member 208*a* and/or the second flexible member 208*b* may permit movement of the diaphragm plate 206 upon activation of the speaker 200 including movement along the central axis 216 of the speaker 200. Each of the first flexible member 208*a* and/or the second flexible member 208*b* may also prevent some movement of the diaphragm plate 206 including a movement away from the central axis 216 of the speaker 200 and/or displacement of the diaphragm plate 206 along the central axis 216 of the speaker 200 that is beyond a threshold displacement. The first flexible member 208*a* and/or the second flexible member 208*b* may also cause the diaphragm plate 206 to return to a resting location within the housing 202 when the speaker 200 is no longer activated.

In some aspects, the one or more flexible members may each include a flexible member front surface and a flexible member back surface, opposite the flexible member front surface, and that are each perpendicular or nearly perpendicular to the central axis 216 of the housing 202. As shown in FIG. 2, both the first flexible member 208*a* and the second flexible member 208*b* may include a flexible member front surface and a flexible member back surface. For example, with respect to the second flexible member 208*b* (but also similarly applicable to the first flexible member 208*a*), the second flexible member 208*b* includes a flexible member front surface 226 and a flexible member back surface 228. The lesser a cross-sectional surface area of the flexible member front surface 226 and/or the flexible member back surface 228, the greater the amount of surface area that the front surface 220 of the diaphragm plate 206 and/or the back surface 222 of diaphragm plate 206, the greater amount of cross-sectional surface are the front surface 220 of the diaphragm plate 206 and/or the back surface 222 of the diaphragm plate 206 can occupy across the interior of the cross-section area of the housing 202 to push and/or pull air. Thus, a totaled cross-sectional area of each of the flexible member front surfaces combined of each flexible member of the diaphragm plate 206 that occupies a smaller percentage of the interior cross-sectional area of the housing 202 may be more efficient for the speaker 200 to generate sound compared to a totaled cross-sectional area of each of the flexible member front surface combined of each flexible member of the diaphragm plate 206 that occupies a larger percentage of the interior cross-sectional area of the housing 202.

In some examples, the first flexible member 208*a* and/or the second flexible member 208*b* may retain the diaphragm plate 206 within the housing 202 so that the position of the diaphragm plate 206 relative to the housing 202 forms a gap 214 between the diaphragm plate 206 and the housing 202. In some aspects, the gap 214 may be no larger than 0.1 millimeters (mm). In some aspects, the gap 214 may allow the diaphragm plate 206 to move freely within the housing 202 (e.g., without friction between the diaphragm plate 206 and the top housing plate 202*a*. As shown in FIG. 2, the first flexible member 208*a* and/or the second flexible member 208*b* may retain the diaphragm plate 206 within the housing 202 so that the position of the diaphragm plate 206 relative to the housing 202 forms a gap 214 between the diaphragm plate 206 and the top housing plate 202*a*. Alternatively to the top housing plate 202*a*, the housing 202 may include a bottom housing plate. In this case, the first flexible member 208*a* and/or the second flexible member 208*b* may retain the diaphragm plate 206 within the housing 202 so that the position of the diaphragm plate 206 relative to the housing 202 forms a gap 214 between the diaphragm plate 206 and the bottom housing plate. In addition, the first flexible member 208*a* and/or the second flexible member 208*b* may maintain the gap 214 between the diaphragm plate 206 and the housing 202 so that as the diaphragm plate 206 moves to push and/or pull air to generate sound, the diaphragm plate 206 may move smoothly within the housing 202.

The diaphragm plate 206 may include a driving device 212. In some aspects, the driving device 212 may be a magnetic circuit, a permanent magnet, and/or a transducer. As shown in FIG. 2, the driving device 212 may be positioned within the diaphragm plate 206 and form a portion of the front surface 220 of the diaphragm plate 206. When the driving device 212 is at least one of a magnetic circuit, a permanent magnet, and/or a transducer, the driving device 212 may interact with an insert plate driving device, such as an electric circuit, an electric coil, or a coil insert. In this case, the driving device 212 may include a recess 230 for receiving the insert plate driving device. When the insert plate driving device extending from a fixed insert plate is aligned with the driving device 212, the insert plate driving device may rest in the recess 230 of the driving device 212. Thus, when the insert plate driving device receives an electric current, the insert plate driving device may drive the movement of the driving device 212 so that the insert plate driving device no longer rests in the recess 230, moving (e.g., oscillating) the diaphragm plate 206 along the central axis 216, pushing and/or pulling air, and generating sound. Additionally, or alternatively, the driving device 212 may be positioned within the diaphragm plate 206 and form a portion of the back surface 222 of the diaphragm plate 206. As described herein, the location of the driving device 212 forming the portion of the back surface 222 of the diaphragm plate 206 may be aligned with an insert plate driving device extending from the surface 218 of the insert plate 204. When an insert plate driving device extending from the fixed insert plate 204 is aligned with the driving device 212, the insert plate driving device may rest in the recess 230 of the driving device 212. When the insert plate driving device receives an electric current, the insert plate driving device may drive movement of the driving device 212 so that the insert plate driving device no longer rests in the recess 230 moving (e.g., oscillating) the diaphragm plate 206 along the central axis 216 pushing and/or pulling air and generating sound.

In some aspects, the driving device 212 may be at least one of an electric circuit, an electric coil, or a coil insert. In this case, the insert plate driving device may be a magnetic circuit, a permanent magnet, and/or a transducer and may include a recess for receiving driving device 212. When the driving device 212 extending from the diaphragm plate 206 is aligned with the insert plate driving device, the driving device 212 may rest in the recess of the insert plate driving device. Thus, when the driving device 212 receives an electric current, the interaction between the insert plate driving device and the driving device 212 may drive movement of the driving device 212 so that the driving device 212 no longer rests in the recess, moving (e.g., oscillating) the diaphragm plate 206 along the central axis 216 pushing and/or pulling air, and generating sound.

Figure 3:
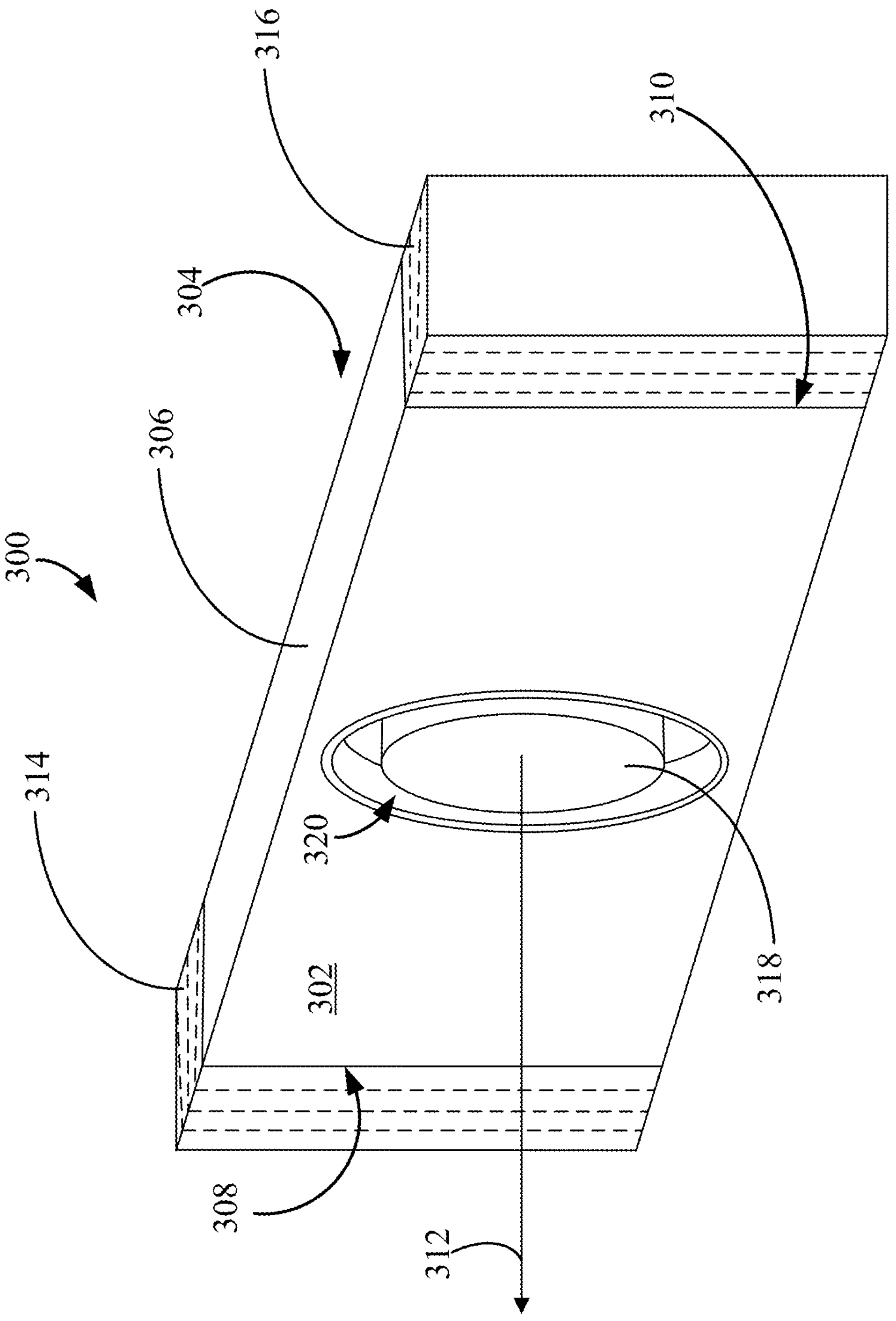
FIG. 3 is a perspective view of a diaphragm plate according to some aspects.

FIG. 3 is a perspective view of a diaphragm plate 300 according to some aspects. The diaphragm plate 300 may include one or more features illustrated in and described with respect to FIGS. 1A, 1B, and 2 including one or more features of the diaphragm plate 206 illustrated in FIG. 2. As shown in FIG. 3, the diaphragm plate 300 may include a rectangular shape for being retained by and for moving through a rectangular housing. In some aspects, the diaphragm plate 300 may alternatively include a triangular shape, a circular shape, an elliptical shape, and/or any other polygonal shape for being retained by and for moving through a similarly shaped housing.

The diaphragm plate 300 may include at least a front surface 302, and a back surface 304 (opposite the front surface 302) that are perpendicular or nearly perpendicular to the central axis 312 of the diaphragm plate 300. The front surface 302 and the back surface 304 of the diaphragm plate 300 are configured to push and/or pull air when moved along the central axis 312 of the diaphragm plate 300 generating sound. The greater a cross-sectional surface area of the front surface 302 and/or the back surface 304 of the diaphragm plate 300, the greater the amount of air the diaphragm plate 300 can push and/or pull to generate sound. In some aspects, the front surface 302 and/or the back surface 304 of the diaphragm plate 300 may have a smooth surface. In some aspects, the front surface 302 and/or the back surface 304 of the diaphragm plate 300 may have corrugated surface for improved sound radiation compared to a smooth surface.

One or more flexible members may be coupled to the diaphragm plate 300. The one or more flexible members may be positioned around a portion (e.g., a length) of the perimeter of the diaphragm plate 300 and coupled to one or more surfaces of the diaphragm plate 300 that are parallel or substantially parallel with the central axis 312 of the diaphragm plate 300. In some aspects, the one or more flexible members may be positioned around a portion of the perimeter of the diaphragm plate 300 that is not an entire perimeter (e.g., an entire perimeter length) of the diaphragm plate 300. In some cases, the one or more flexible members may be positioned anywhere along the perimeter of the diaphragm plate 300. In some cases, when the one or more flexible members includes a plurality of flexible members, each flexible member of the plurality of flexible members may occupy varying lengths of the perimeter of the diaphragm plate 300 or same equal portions of a length of a fractional portion of the perimeter of the diaphragm plate 300.

The diaphragm plate 300 may also include a top surface 306, a first side surface 308, and a second side surface 310. The top surface 306 may face a gap between the diaphragm plate 300 and a housing. As shown in FIG. 3, a first flexible member 314 and a second flexible member 316 may be fixedly attached to each of the first side surface 308 and the second side surface 310, respectively. The first flexible member 314 may be positioned along a first side surface 308 of the diaphragm plate 300 for coupling the diaphragm plate 300 to a side of a housing. The second flexible member 316 may be positioned along a second side surface 310 of the diaphragm plate 300 for coupling the diaphragm plate 300 to another side of the housing. When attached to a housing, each of the first flexible member 314 and/or the second flexible member 316 may be a material that elastically bends, flexes, extends, and/or compress during movement of the diaphragm plate 300 relative to the housing. In some examples, each of the first flexible member 314 and/or the second flexible member 316 may be a non-gas permeable material or a gas-permeable material.

During use with a speaker, the diaphragm plate 300 may move relative to a housing along the central axis 312 of the diaphragm plate 300 under the constraints of the first flexible member 314 and/or the second flexible member 316. Each of the first flexible member 314 and/or the second flexible member 316 may permit movement of the diaphragm plate 300 upon activation of the speaker including movement along the central axis 312. Each of the first flexible member 314 and/or the second flexible member 316 may also prevent some movement of the diaphragm plate 300 including a movement away from the central axis 312 and/or displacement of the diaphragm plate 300 along the central axis 312 that is beyond a threshold displacement. The first flexible member 314 and/or the second flexible member 316 may also cause the diaphragm plate 300 to return to a resting location within the housing when the speaker is no longer activated.

The diaphragm plate 300 may include a driving device 318. In some aspects, the driving device 318 may be a magnetic circuit, a permanent magnet, and/or a transducer. As shown in FIG. 3, the driving device 318 may be positioned within the diaphragm plate 300 and form a portion of the front surface 302 of the diaphragm plate 300. When the driving device 318 is at least one of a magnetic circuit, a permanent magnet, and/or a transducer, the driving device 318 may interact with an insert plate driving device, such as an electric circuit, an electric coil, or a coil insert. In this case, the driving device 318 may include a recess 320 for receiving the insert plate driving device. When the insert plate driving device extending from a fixed insert plate is aligned with the driving device 318, the insert plate driving device may rest in the recess 320 of the driving device 318. Thus, when the insert plate driving device receives an electric current, the insert plate driving device may drive the movement of the driving device 318 so that the insert plate driving device no longer rests in the recess 320, moving (e.g., oscillating) the diaphragm plate 206 along the central axis 312, pushing and/or pulling air, and generating sound. Additionally, or alternatively, the driving device 318 may be positioned within the diaphragm plate 300 and form a portion of the back surface 304 of the diaphragm plate 300. As described herein, the location of the driving device 318 forming the portion of the back surface 304 of the diaphragm plate 300 may be aligned with an insert plate driving device extending from a surface of an insert plate. When an insert plate driving device extending from the fixed insert plate is aligned with the driving device 318, the insert plate driving device may rest in the recess 320 of the driving device 318. When the insert plate driving device receives an electric current, the insert plate driving device may drive movement of the driving device 318 so that the insert plate driving device no longer rests in the recess 320, moving (e.g., oscillating) the diaphragm plate 300 along the central axis 312, pushing and/or pulling air, and generating sound.

In some aspects, the driving device 318 may be at least one of an electric circuit, an electric coil, or a coil insert. In this case, the insert plate driving device may be a magnetic circuit, a permanent magnet, and/or a transducer and may include a recess for receiving driving device 318. When the driving device 318 extending from the diaphragm plate 300 is aligned with the insert plate driving device, the driving device 318 may rest in the recess of the insert plate driving device. Thus, when the driving device 318 receives an electric current, the interaction between the insert plate driving device and the driving device 318 may drive movement of the driving device 318 so that the driving device 318 no longer rests in the recess, moving (e.g., oscillating) the diaphragm plate 300 along the central axis 312, pushing and/or pulling air, and generating sound.

Figure 4:
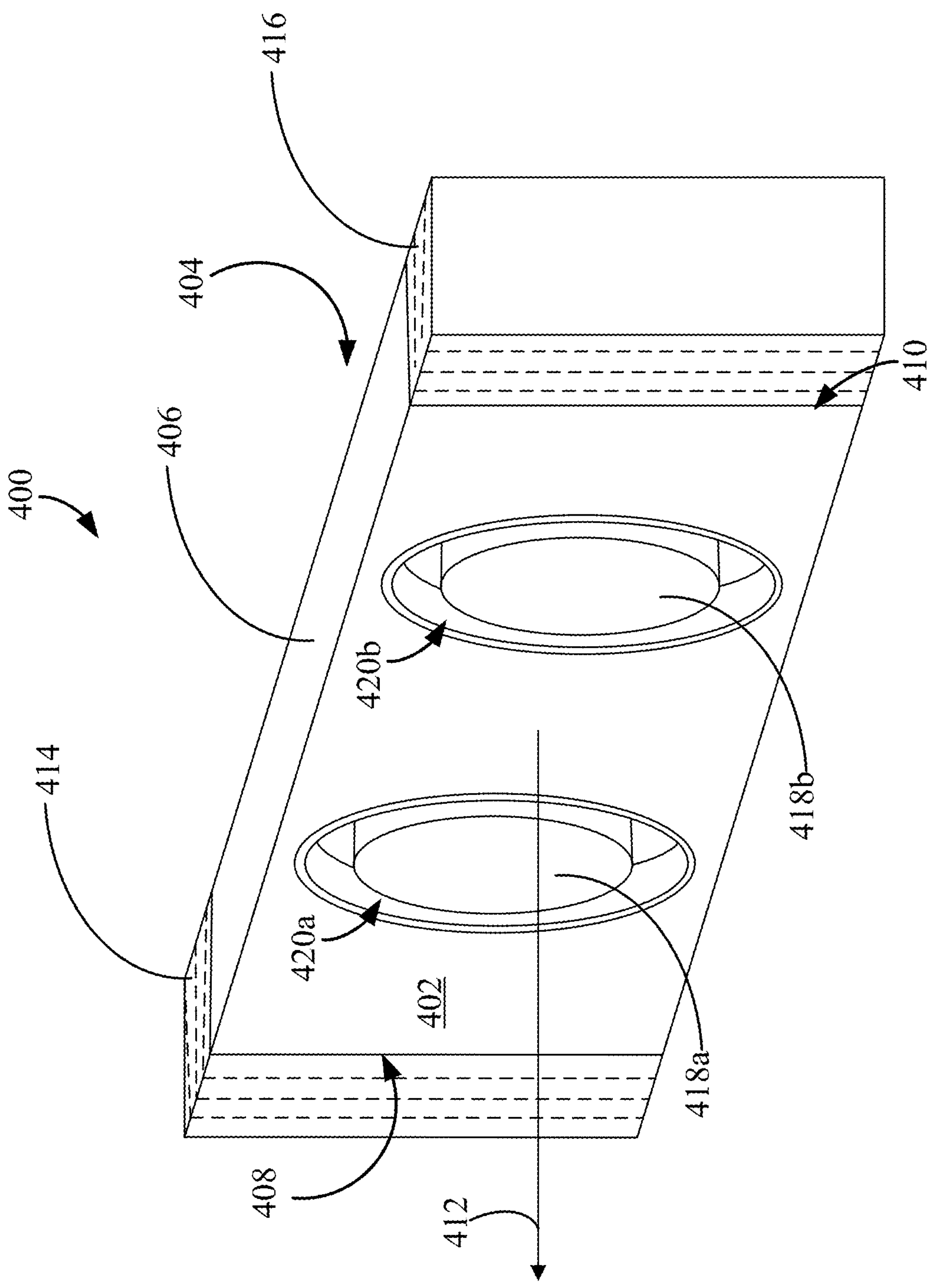
FIG. 4 is a perspective view of another diaphragm plate according to some aspects.

FIG. 4 is a perspective view of another diaphragm plate 400 according to some aspects. The diaphragm plate 400 may include one or more features illustrated in and described with respect to FIGS. 1A, 1B, 2, and 3 including one or more features of the diaphragm plate 300 illustrated in FIG. 3. As shown in FIG. 4, the diaphragm plate 400 may include a rectangular shape for being retained by and for moving through a rectangular housing. In some aspects, the diaphragm plate 400 may alternatively include a triangular shape, a circular shape, an elliptical shape, and/or any other polygonal shape for being retained by and for moving through a similarly shaped housing.

The diaphragm plate 400 may include at least a front surface 402, and a back surface 404 (opposite the front surface 402) that are perpendicular or nearly perpendicular to the central axis 412 of the diaphragm plate 400. The front surface 402 and the back surface 404 of the diaphragm plate 400 are configured to push and/or pull air when moved along the central axis 412 of the diaphragm plate 400 generating sound. The greater a cross-sectional surface area of the front surface 402 and/or the back surface 404 of the diaphragm plate 400, the greater the amount of air the diaphragm plate 400 can push and/or pull to generate sound. In some aspects, the front surface 402 and/or the back surface 404 of the diaphragm plate 400 may have a smooth surface. In some aspects, the front surface 402 and/or the back surface 404 of the diaphragm plate 400 may have corrugated surface for improved sound radiation compared to a smooth surface.

One or more flexible members may be coupled to the diaphragm plate 400. The one or more flexible members may be positioned around a portion (e.g., a length) of the perimeter of the diaphragm plate 400 and coupled to one or more surfaces of the diaphragm plate 400 that are parallel or substantially parallel with the central axis 412 of the diaphragm plate 400. In some aspects, the one or more flexible members may be positioned around a portion of the perimeter of the diaphragm plate 400 that is not an entire perimeter (e.g., an entire perimeter length) of the diaphragm plate 400. In some cases, the one or more flexible members may be positioned anywhere along the perimeter of the diaphragm plate 400. In some cases, when the one or more flexible members includes a plurality of flexible members, each flexible member of the plurality of flexible members may occupy varying lengths of the perimeter of the diaphragm plate 400 or same equal portions of a length of a fractional portion of the perimeter of the diaphragm plate 400.

The diaphragm plate 400 may also include a top surface 406, a first side surface 408, and a second side surface 410. The top surface 306 may face a gap between the diaphragm plate 400 and a housing. As shown in FIG. 4, a first flexible member 414 and a second flexible member 416 may be fixedly attached to each of the first side surface 408 and the second side surface 410, respectively. The first flexible member 414 may be positioned along a first side surface 408 of the diaphragm plate 400 for coupling the diaphragm plate 400 to a side of a housing. The second flexible member 416 may be positioned along a second side surface 410 of the diaphragm plate 400 for coupling the diaphragm plate 400 to another side of the housing. When attached to a housing, each of the first flexible member 414 and/or the second flexible member 416 may be a material that elastically bends, flexes, extends, and/or compress during movement of the diaphragm plate 400 relative to the housing. In some examples, each of the first flexible member 414 and/or the second flexible member 416 may be a non-gas permeable material or a gas-permeable material.

During use with a speaker, the diaphragm plate 400 may move relative to a housing along the central axis 412 of the diaphragm plate 400 under the constraints of the first flexible member 414 and/or the second flexible member 416. Each of the first flexible member 414 and/or the second flexible member 416 may permit movement of the diaphragm plate 400 upon activation of the speaker including movement along the central axis 412. Each of the first flexible member 414 and/or the second flexible member 416 may also prevent some movement of the diaphragm plate 400 including a movement away from the central axis 412 and/or displacement of the diaphragm plate 400 along the central axis 412 that is beyond a threshold displacement. The first flexible member 414 and/or the second flexible member 416 may also cause the diaphragm plate 400 to return to a resting location within the housing when the speaker is no longer activated.

The diaphragm plate 400 may include a plurality of driving devices. For example, the diaphragm plate 400 may include at least a first driving device 418*a* and a second driving device 418*b*. In some aspects, at least one of the first driving device 418*a* or the second driving device 418*b* may be a magnetic circuit, a permanent magnet, and/or a transducer. As shown in FIG. 4, each of the first driving device 418*a* and the second driving device 418*b* may be positioned within the diaphragm plate 400 and form a portion of the front surface 402 of the diaphragm plate 400. When each of the first driving device 418*a* and the second driving device 418*b* is at least one of a magnetic circuit, a permanent magnet, and/or a transducer, each of the first driving device 418*a* and the second driving device 418*b* may interact with an insert plate driving device, such as an electric circuit, an electric coil, or a coil insert. In this case, the first driving device 418*a* may include a first recess 420*a* for receiving a first insert plate driving device and the second driving device 418*b* may include a second recess 420*b* for receiving a second insert plate driving device. When the first insert plate driving device and the second insert plate driving device each extending from a fixed insert plate are aligned with the first driving device 418*a* and the second driving device 418*b*, respectively, the first insert plate driving device may rest in the first recess 420*a* of the first driving device 418*a* and the second insert plate driving deice may rest in the second recess 420*b* of the second driving device 418*b*. Thus, when the first insert plate driving device receives an electric current, the first insert plate driving device may drive the movement of the first driving device 418*a* so that the first insert plate driving device no longer rests in the first recess 420*a*, moving (e.g., oscillating) the diaphragm plate 400 along the central axis 412, pushing and/or pulling air, and generating sound. Similarly, when the second insert plate driving device receives an electric current, the second insert plate driving device may drive the movement of the second driving device 418*b* so that the second insert plate driving device no longer rests in the second recess 420*b*, moving (e.g., oscillating) the diaphragm plate 400 along the central axis 412, pushing and/or pulling air, and generating sound.

Additionally, or alternatively, each of the first driving device 418*a* and the second driving device 418*b* may be positioned within the diaphragm plate 400 and form a portion of the back surface 404 of the diaphragm plate 400. As described herein, the location of the first driving device 418*a* forming the portion of the back surface 404 of the diaphragm plate 400 may be aligned with a first insert plate driving device extending from a surface of an insert plate. Similarly, the location of the second driving device 418*b* forming the portion of the back surface 404 of the diaphragm plate 400 may be aligned with a second insert plate driving device extending from a surface of an insert plate. When a first insert plate driving device extending from the fixed insert plate is aligned with the first driving device 418*a*, the first insert plate driving device may rest in the first recess 420*a* of the first driving device 418*a*. When the first insert plate driving device receives an electric current, the first insert plate driving device may drive movement of the first driving device 418*a* so that the first insert plate driving device no longer rests in the first recess 420*a*, moving (e.g., oscillating) the diaphragm plate 400 along the central axis 412, pushing and/or pulling air, and generating sound. Similarly, when a second insert plate driving device extending from the fixed insert plate is aligned with the second driving device 418*b*, the second insert plate driving device may rest in the second recess 420*b* of the second driving device 418*b*. When the second insert plate driving device receives an electric current, the second insert plate driving device may drive movement of the second driving device

418*b* so that the second insert plate driving device no longer rests in the second recess 420*b*, moving (e.g., oscillating) the diaphragm plate 400 along the central axis 412, pushing and/or pulling air, and generating sound.

It should be understood that, in some aspects, both the first insert plate driving device and the second plate insert driving device may simultaneously receive an electric current and move the first driving device 418*a* and the second driving device 418*b* at a same time. In some aspects, the first insert plate driving device and the second plate insert driving device may receive an electric current at different times and move the first driving device 418*a* and the second driving device 418*b* at different times. In some aspects, the electric current may be a same electric current. For example, the first insert plate driving device and the second insert plate driving device may each receive an electric current that shares at least one of a same power (e.g., watts), a same voltage (e.g., volts), a same current (e.g., amps), a same amplitude, a same phase, or the like. In some aspects, the first insert plate driving device may receive a first electric current and the second plate insert driving device may receive a second electric current that is different from the first electric current. For example, the first electric current may have at least one of a different power (e.g., watts), a different voltage (e.g., volts), a different current (e.g., amps), a different amplitude, a different phase, or the like compared to the second electric current.

In some aspects, at least one of the first driving device 418*a* or the second driving device 418*b* may be at least one of an electric circuit, an electric coil, or a coil insert. In this case, a corresponding first insert plate driving device and/or a second insert plate driving device may be a magnetic circuit, a permanent magnet, and/or a transducer. The first insert plate driving device and the second insert plate driving device may each include a recess, such as a first recess and a second recess, respectively, for receiving the first driving device 418*a* and the second driving device 418*b*. When the first driving device 418*a* extending from the diaphragm plate 400 is aligned with the first insert plate driving device, the first driving device 418*a* may rest in the first recess of the first insert plate driving device. Thus, when the first driving device 418*a* receives an electric current, the interaction between the first insert plate driving device and the first driving device 418*a* may drive movement of the first driving device 418*a* so that the first driving device 418*a* no longer rests in the first recess, moving (e.g., oscillating) the diaphragm plate 400 along the central axis 412, pushing and/or pulling air, and generating sound. Similarly, when the second driving device 418*b* extending from the diaphragm plate 400 is aligned with the second insert plate driving device, the second driving device 418*b* may rest in the second recess of the second insert plate driving device. Thus, when the second driving device 418*b* receives an electric current, the interaction between the second insert plate driving device and the second driving device 418*b* may drive movement of the second driving device 418*b* so that the second driving device 418*b* no longer rests in the second recess, moving (e.g., oscillating) the diaphragm plate 400 along the central axis 412, pushing and/or pulling air, and generating sound.

It should be understood that, in some aspects, both the first driving device 418*a* and the second driving device 418*b* may simultaneously receive an electric current and move at a same time. In some aspects, the first driving device 418*a* and the second driving device 418*b* may receive an electric current at different times and move at different times. In some aspects, the electric current may be a same electric current. For example, the first driving device 418*a* and the second driving device 418*b* may each receive an electric current that shares at least one of a same power (e.g., watts), a same voltage (e.g., volts), a same current (e.g., amps), a same amplitude, a same phase, or the like. In some aspects, the first driving device 418*a* may receive a first electric current and the second driving device 418*b* may receive a second electric current that is different from the first electric current. For example, the first electric current may have at least one of a different power (e.g., watts), a different voltage (e.g., volts), a different current (e.g., amps), a different amplitude, a different phase, or the like compared to the second electric current.

Figure 5:
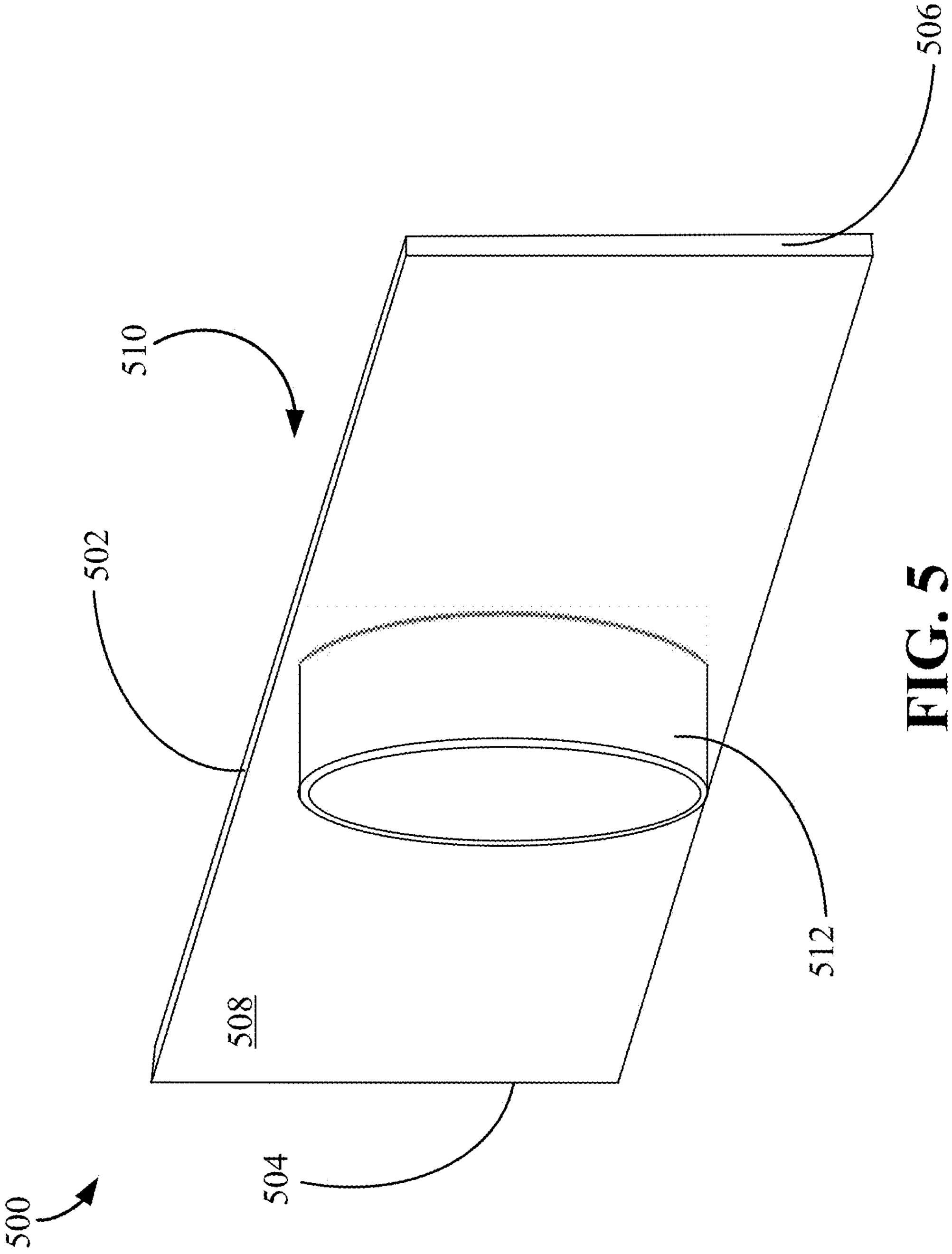
FIG. 5 is a perspective view of an insert plate according to some aspects.

FIG. 5 is a perspective view of an insert plate 500 according to some aspects. The insert plate 500 may include one or more features illustrated in and described with respect to FIGS. 1A, 1B, and 2 including one or more features of the insert plate 204 illustrated in FIG. 2. The insert plate 500 may include a top surface 502, a first side surface 504, a second side surface 506, a front surface 508, and a back surface 510. The insert plate 500 may be fixedly attached to a housing via at least one of the top surface 502, the first side surface 504, or the second side surface 506. The insert plate 500 may include an insert plate driving device 512 extending from the front surface 508. The insert plate driving device 512 may include at least one of an electric circuit, an electric coil, or a coil insert. When the insert plate driving device 512 includes at least one of an electric circuit, an electric coil, or a coil insert, a driving device aligned with the insert plate driving device 512, as described herein, may be at least one of a magnetic circuit, a permanent magnet, and/or a transducer. Alternatively, the insert plate driving device 512 may include at least one of a magnetic circuit, a permanent magnet, and/or a transducer. When the insert plate driving device 512 includes at least one of a magnetic circuit, a permanent magnet, and/or a transducer, a driving device aligned with the insert plate driving device 512, as described herein, may be at least one of an electric circuit, an electric coil, or a coil insert.

The insert plate 500 may be positioned adjacent and/or between one or more diaphragm plates and may be separated a distance from each of the one or more diaphragm plates to accommodate one or more dimensions of the insert plate driving device 512. When a diaphragm plate adjacent the insert plate 500 is driven to move relative to a housing, as described herein, the insert plate 500 may remain in a fixed position relative to the housing. In some aspects, the insert plate 500 may additionally, or alternatively, include another insert plate driving device extending from the back surface 510.

Figure 6:
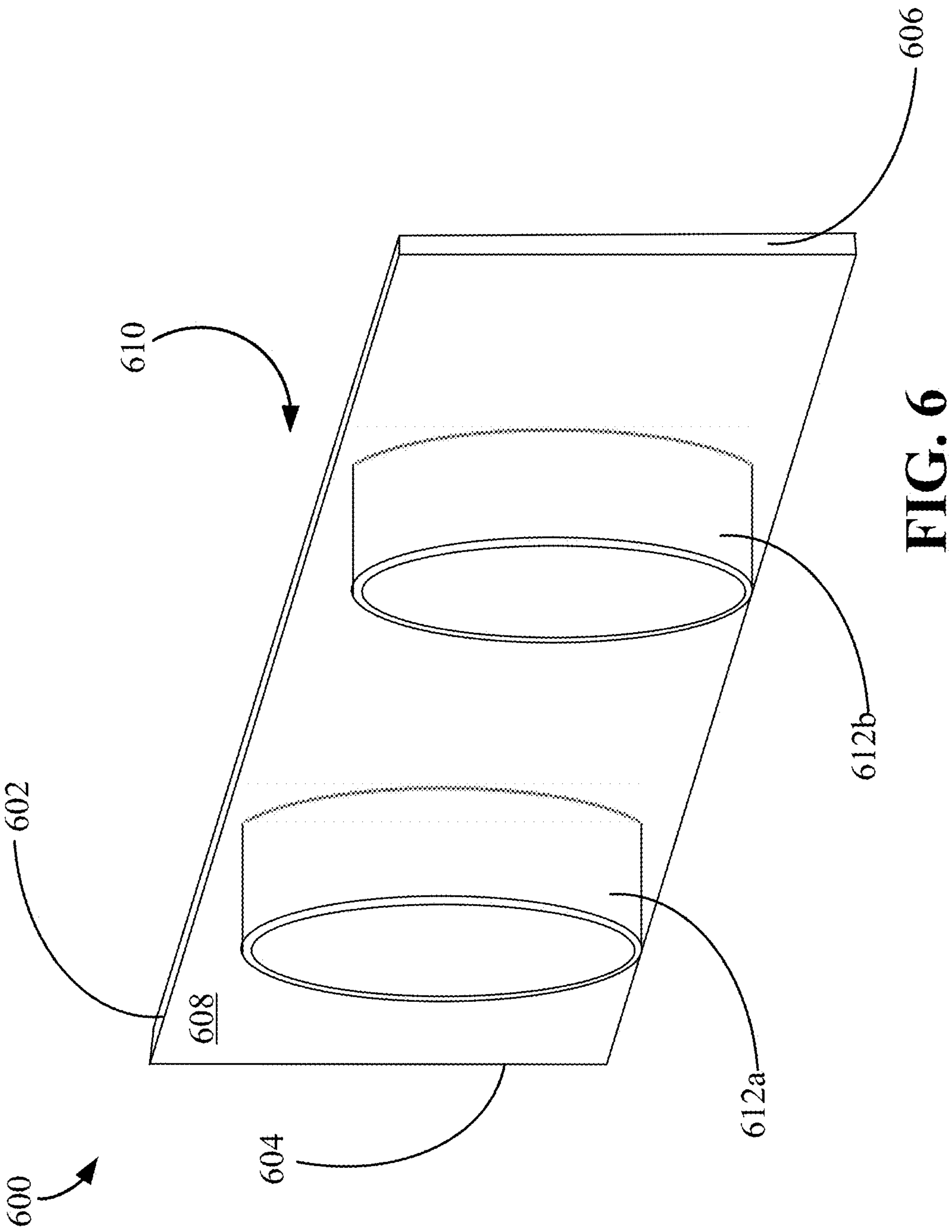
FIG. 6 is a perspective view of another insert plate according to some aspects.

FIG. 6 is a perspective view of another insert plate 600 according to some aspects. The insert plate 600 may include one or more features illustrated in and described with respect to FIGS. 1A, 1B, 2, and 5 including one or more features of the insert plate 500 illustrated in FIG. 5. The insert plate 600 may include a top surface 602, a first side surface 604, a second side surface 606, a front surface 608, and a back surface 610. The insert plate 600 may be fixedly attached to a housing via at least one of the top surface 602, the first side surface 604, or the second side surface 606. The insert plate 600 may include a plurality of insert plate driving devices. For example, the insert plate 600 may include at least a first insert plate driving device 612*a* and a second insert plate driving device 612*b* each extending from the front surface 608.

In some aspects, at least one of the first insert plate driving device 612*a* or the second insert plate driving device 612*b* may include at least one of an electric circuit, an electric coil, or a coil insert. When the first insert plate driving device 612*a* includes at least one of an electric circuit, an electric coil, or a coil insert, a first driving device aligned with the first insert plate driving device 612*a*, as described herein, may be at least one of a magnetic circuit, a permanent magnet, and/or a transducer. Similarly, when the second insert plate driving device 612*b* includes at least one of an electric circuit, an electric coil, or a coil insert, a second driving device aligned with the second insert plate driving device 612*b*, as described herein, may be at least one of a magnetic circuit, a permanent magnet, and/or a transducer.

It should be understood that, in some aspects, both the first insert plate driving device 612*a* and the second insert plate driving device 612*b* may simultaneously receive an electric current so that the first insert plate driving device 612*a* may move an aligned first driving device and so that the second insert plate driving device 612*b* may move an aligned second driving device, respectively, at a same time. In some aspects, the first insert plate driving device 612*a* and the second insert plate driving device 612*b* may each receive an electric current at different times so that the first insert plate driving device 612*a* may move an aligned first driving device and so that the second insert plate driving device 612*b* may move an aligned second driving device, respectively, at different times. In some aspects, the electric current may be a same electric current. For example, the first insert plate driving device 612*a* and the second insert plate driving device 612*b* may each receive an electric current that shares at least one of a same power (e.g., watts), a same voltage (e.g., volts), a same current (e.g., amps), a same amplitude, a same phase, or the like. In some aspects, the first insert plate driving device 612*a* may receive a first electric current and the second insert plate driving device 612*b* may receive a second electric current that is different from the first electric current. For example, the first electric current may have at least one of a different power (e.g., watts), a different voltage (e.g., volts), a different current (e.g., amps), a different amplitude, a different phase, or the like compared to the second electric current.

Alternatively, in some aspects, at least one of the first insert plate driving device 612*a* or the second insert plate driving device 612*b* may include at least one of a magnetic circuit, a permanent magnet, and/or a transducer. When the first insert plate driving device 612*a* includes at least one of a magnetic circuit, a permanent magnet, and/or a transducer, a first driving device aligned with the first insert plate driving device 612*a*, as described herein, may be at least one of an electric circuit, an electric coil, or a coil insert. Similarly, when the second insert plate driving device 612*b* includes at least one of a magnetic circuit, a permanent magnet, and/or a transducer, a second driving device aligned with the second insert plate driving device 612*b*, as described herein, may be at least one of an electric circuit, an electric coil, or a coil insert.

The insert plate 600 may be positioned adjacent and/or between one or more diaphragm plates and may be separated a distance from each of the one or more diaphragm plates to accommodate one or more dimensions of first the insert plate driving device 612*a* and/or the second insert plate driving device 612*b*. When a diaphragm plate adjacent the insert plate 600 is driven to move relative to a housing, as described herein, the insert plate 600 may remain in a fixed position relative to the housing. In some aspects, the insert plate 600 may additionally, or alternatively, include another insert plate driving device extending from the back surface 610.

Figure 7:
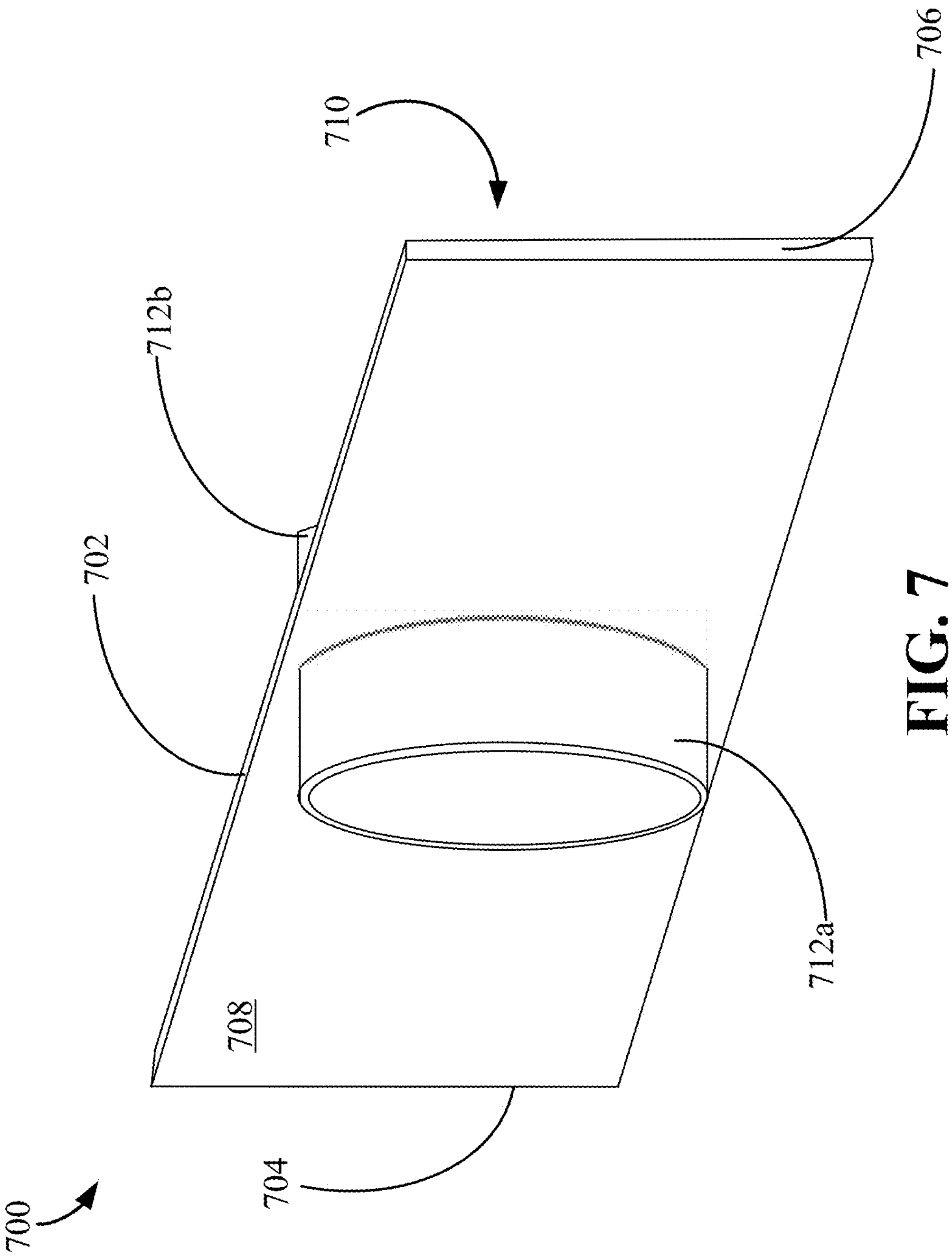
FIG. 7 is a perspective view of yet another insert plate according to some aspects.

FIG. 7 is a perspective view of yet another insert plate 700 according to some aspects. The insert plate 700 may include one or more features illustrated in and described with respect to FIGS. 1A, 1B, 2, 5, and 6 including one or more features of the insert plate 500 illustrated in FIG. 5 and the insert plate 600 illustrated in FIG. 6. The insert plate 700 may include a top surface 702, a first side surface 704, a second side surface 706, a front surface 708, and a back surface 710. The insert plate 700 may be fixedly attached to a housing via at least one of the top surface 702, the first side surface 704, or the second side surface 706.

The insert plate 700 may include a plurality of insert plate driving devices. For example, the insert plate 700 may include at least a first insert plate driving device 712*a* extending from the front surface 708 and a second insert plate driving device 512*b* extending from the back surface 710. In some aspects, at least one of the first insert plate driving device 712*a* or the second insert plate driving device 712*b* may include at least one of an electric circuit, an electric coil, or a coil insert. When the first insert plate driving device 712*a* includes at least one of an electric circuit, an electric coil, or a coil insert, a first driving device aligned to receive the first insert plate driving device 712*a*, as described herein, may be at least one of a magnetic circuit, a permanent magnet, and/or a transducer. Similarly, when the second insert plate driving device 712*b* includes at least one of an electric circuit, an electric coil, or a coil insert, a second driving device aligned to receive the second insert plate driving device 712*b*, as described herein, may be at least one of a magnetic circuit, a permanent magnet, and/or a transducer. In this case, the first driving device aligned to receive the first insert plate driving device 712*a* may be positioned on or in a first diaphragm plate located adjacent to and on a same side of the insert plate 700 as the first insert plate driving device 712*a*. Similarly, the second driving device aligned to receive the second insert plate driving device 712*b* may be positioned on or in a second diaphragm plate located adjacent to and on a same side of the insert plate 700 as the second insert plate driving device 712*b*.

It should be understood that, in some aspects, both the first insert plate driving device 712*a* and the second insert plate driving device 712*b* may simultaneously receive an electric current so that the first insert plate driving device 712*a* may move an aligned first driving device and so that the second insert plate driving device 712*b* may move an aligned second driving device, respectively, at a same time. In some aspects, the first insert plate driving device 712*a* and the second insert plate driving device 712*b* may each receive an electric current at different times so that the first insert plate driving device 712*a* may move an aligned first driving device and so that the second insert plate driving device 712*b* may move an aligned second driving device, respectively, at different times. In some aspects, the electric current may be a same electric current. For example, the first insert plate driving device 712*a* and the second insert plate driving device 712*b* may each receive an electric current that shares at least one of a same power (e.g., watts), a same voltage (e.g., volts), a same current (e.g., amps), a same amplitude, a same phase, or the like. In some aspects, the first insert plate driving device 712*a* may receive a first electric current and the second insert plate driving device 712*b* may receive a second electric current that is different from the first electric current. For example, the first electric current may have at least one of a different power (e.g., watts), a different voltage (e.g., volts), a different current (e.g., amps), a different amplitude, a different phase, or the like compared to the second electric current.

Alternatively, in some aspects, at least one of the first insert plate driving device 712*a* or the second insert plate driving device 712*b* may include at least one of a magnetic circuit, a permanent magnet, and/or a transducer. When the first insert plate driving device 712*a* includes at least one of a magnetic circuit, a permanent magnet, and/or a transducer, a first driving device aligned with the first insert plate driving device 712*a*, as described herein, may be at least one of an electric circuit, an electric coil, or a coil insert. Similarly, when the second insert plate driving device 712*b* includes at least one of a magnetic circuit, a permanent magnet, and/or a transducer, a second driving device aligned with the second insert plate driving device 712*b*, as described herein, may be at least one of an electric circuit, an electric coil, or a coil insert.

The insert plate 700 may be positioned adjacent and/or between one or more diaphragm plates and may be separated a distance from each of the one or more diaphragm plates to accommodate one or more dimensions of the insert plate driving devices 712*a* and 712*b*, respectively. When a diaphragm plate adjacent the insert plate 700 is driven to move relative to a housing, as described herein, the insert plate 700 may remain in a fixed position relative to the housing.

Figure 8:
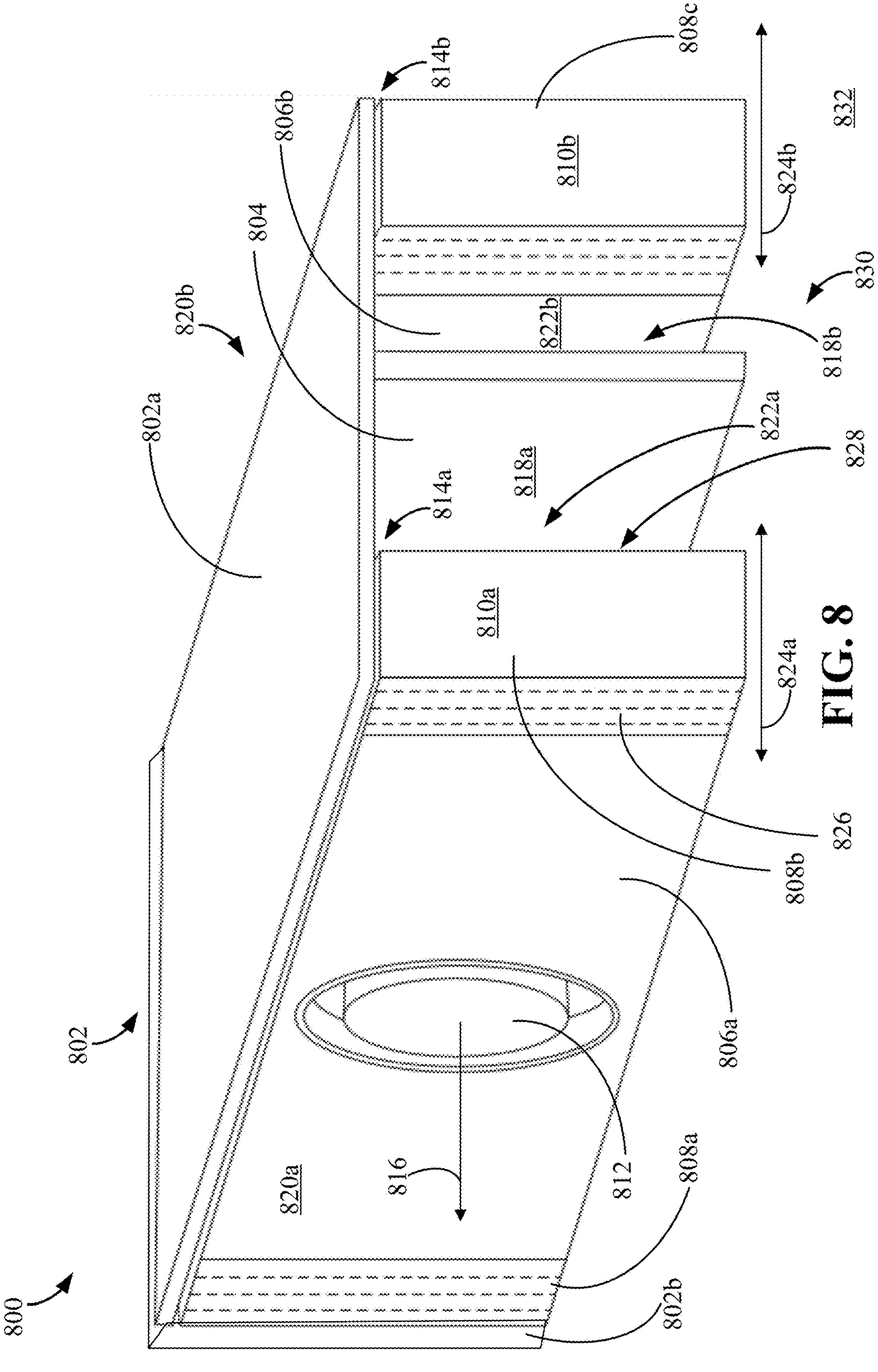
FIG. 8 is a perspective view of a cross-section of a speaker according to some aspects.

FIG. 8 is a perspective view of a cross-section of a speaker 800 according to some aspects. The speaker 800 may include one or more features illustrated in and described with respect to FIGS. 1A, 1B, 2, 3, 4, 5, 6, and 7 and may include one or more feature of the speaker 200 illustrated in FIG. 2. As shown in FIG. 8, the speaker 800 may include a housing 802, an insert plate 804, a first diaphragm plate 806*a*, and a second diaphragm plate 806*b*. The housing 802 may include one or more plates for at least partially enclosing the insert plate 804, the first diaphragm plate 806*a*, and the second diaphragm plate 806*b*. For example, the housing 802 may include a top housing plate 802*a* and a side housing plate 802*b*. In some examples, the housing 802 may additionally include another side housing plate positioned on an opposite side of the speaker 800 from the side housing plate 802*b*. It should be understood that while the speaker 800 including the housing 802, the insert plate 804, the first diaphragm plate 806*a*, and the second diaphragm plate 806*b* illustrated in FIG. 8 have a rectangular shape, the speaker 800 and one or more of its components may include a triangular shape, a circular shape, an elliptical shape, and/or any other polygonal shape.

The insert plate 804 may be fixedly attached to the housing 802. For example, the insert plate 804 may be fixedly attached to the housing 802 at the top housing plate 802*a* and/or the side housing plate 802*b*. Additionally, or alternatively, the insert plate 804 may be fixedly attached to the housing 802 at another side housing plate positioned on an opposite side of the speaker 800 from the side housing plate 802*b*. The insert plate 804 may include a first insert plate driving device and a second insert plate driving device, as described herein at least with respect to FIG. 7. For example, a first insert plate driving device may extend from a first surface 818*a* of the insert plate 804 and towards the first diaphragm plate 806*a*. A second insert plate driving device may extend from a second surface 818*b* of the insert plate 804 and towards the second diaphragm plate 806*b*.

The first diaphragm plate 806*a* may be positioned adjacent the first surface 818*a* of the insert plate 804 and may be separated a distance from the insert plate 804 to accommodate one or more dimensions of the first insert plate driving device. The first diaphragm plate 806*a* may include at least a first front surface 820*a* and a first back surface 822*a* (opposite the first front surface 820*a*) that are perpendicular or nearly perpendicular to the central axis 816 of the housing 802. The first front surface 820*a* and the first back surface 822*a* of the first diaphragm plate 806*a* are configured to push and/or pull air when moved along the first path 824*a* parallel or nearly parallel to the central axis 816 of the housing 802 generating sound. The greater a cross-sectional surface area of the first front surface 820*a* and/or the first back surface 822*a* of the first diaphragm plate 806*a*, the greater the amount of air the first diaphragm plate 806*a* can push and/or pull to generate sound. Thus, a first diaphragm plate 806*a* with a first front surface 820*a* and/or a first back surface 822*a* with a cross-sectional surface area that occupies a larger percentage of the interior cross-sectional area of the housing 802 may be more efficient at generating sound compared to a first diaphragm plate 806*a* with a first front surface 820*a* and/or a first back surface 822*a* with a cross-sectional surface area that occupies a smaller percentage of the interior cross-sectional area of the housing 802.

In some aspects, one or more flexible members may be fixedly attached to the first diaphragm plate 806*a*. The one or more flexible members may be positioned around a portion (e.g., a length) of the perimeter of the first diaphragm plate 806*a* and coupled to one or more surfaces of the first diaphragm plate 806*a* that are parallel or substantially parallel with the central axis 816 of the housing 802. In some aspects, the one or more flexible members may be positioned around a portion of the perimeter of the first diaphragm plate 806*a* that is not an entire perimeter (e.g., an entire perimeter length) of the first diaphragm plate 806*a*. In some cases, the one or more flexible members may be positioned anywhere along the perimeter of the first diaphragm plate 806*a*. In some cases, when the one or more flexible members includes a plurality of flexible members, each flexible member of the plurality of flexible members may occupy varying lengths of the perimeter of the first diaphragm plate 806*a* or same equal portions of a length of the perimeter of the first diaphragm plate 806*a*.

As another example, as illustrated in FIG. 8, a first flexible member 808*a* and a second flexible member 808*b* may be fixedly attached to the first diaphragm plate 806*a*. The first flexible member 808*a* may be positioned along a first side of the first diaphragm plate 806*a* and may couple the first diaphragm plate 806*a* to the side housing plate 802*b* via a side surface of the first flexible member 808*a*. The second flexible member 808*b* may be positioned along a second side of the first diaphragm plate 806*a* and may couple the first diaphragm plate 806*a* to the other side housing plate described herein via the second side surface 810*a*. Each of the first flexible member 808*a* and/or the second flexible member 808*b* may be a material that elastically bends, flexes, extends, and/or compress during movement of the first diaphragm plate 806*a*. In some examples, each of the first flexible member 808*a* and/or the second flexible member 808*b* may be a non-gas permeable material or a gas-permeable material.

The second diaphragm plate 806*b* may be positioned adjacent the second surface 818*b* of the insert plate 804 and may be separated a distance from the insert plate 804 to accommodate one or more dimensions of the second insert plate driving device. At least similar to the first diaphragm plate 806*a*, the second diaphragm plate 806*b* may include at least a second front surface 820*b* and a second back surface 822*b* (opposite the second front surface 820*b*) that are perpendicular or nearly perpendicular to the central axis 816 of the housing 802. The second front surface 820*b* and the second back surface 822*b* of the second diaphragm plate 806*b* are configured to push and/or pull air when moved along the second path 824*b* parallel or nearly parallel to the central axis 816 of the housing 802 generating sound. The greater a cross-sectional surface area of the second front surface 820*b* and/or the second back surface 822*b* of the first diaphragm plate 806*a*, the greater the amount of air the first diaphragm plate 806*a* can push and/or pull to generate sound. Thus, a first diaphragm plate 806*a* with a first front surface 820*a* and/or a first back surface 822*a* with a cross-sectional surface area that occupies a larger percentage of the interior cross-sectional area of the housing 802 may be more efficient at generating sound compared to a first diaphragm plate 806*a* with a first front surface 820*a* and/or a first back surface 822*a* with a cross-sectional surface area that occupies a smaller percentage of the interior cross-sectional area of the housing 802.

In some aspects, one or more flexible members may be fixedly attached to the second diaphragm plate 806*b*. The one or more flexible members may be positioned around a portion (e.g., a length) of the perimeter of the second diaphragm plate 806*b* and coupled to one or more surfaces of the second diaphragm plate 806*b* that are parallel or substantially parallel with the central axis 816 of the housing 802. In some aspects, the one or more flexible members may be positioned around a portion of the perimeter of the second diaphragm plate 806*b* that is not an entire perimeter (e.g., an entire perimeter length) of the second diaphragm plate 806*b*. In some cases, the one or more flexible members may be positioned anywhere along the perimeter of the second diaphragm plate 806*b*. In some cases, when the one or more flexible members includes a plurality of flexible members, each flexible member of the plurality of flexible members may occupy varying lengths of the perimeter of the second diaphragm plate 806*b* or same equal portions of a length of the perimeter of the second diaphragm plate 806*b*.

As another example, as illustrated in FIG. 8, a third flexible member and a fourth flexible member 808*c* may be fixedly attached to the second diaphragm plate 806*b*. The third flexible member may be positioned along a first side of the second diaphragm plate 806*b* and may couple the second diaphragm plate 806*b* to the side housing plate 802*b* via a side surface of the third flexible member. The third flexible member may be positioned along a second side of the second diaphragm plate 806*b* and may couple the second diaphragm plate 806*b* to the other side housing plate described herein via the fourth side surface 810*b*. Each of the third flexible member and/or the fourth flexible member 808*c* may be a material that elastically bends, flexes, extends, and/or compress during movement of the second diaphragm plate 806*b*. In some examples, each of the third flexible member and/or the fourth flexible member 808*c* may be a non-gas permeable material or a gas-permeable material.

Upon activation of the speaker 800, the first diaphragm plate 806*a* and/or the second diaphragm plate 806*b* may move relative to the housing 802 along a central axis 816 of the housing 802 under the constraints of their respective flexible members. Each of the flexible members associated with the first diaphragm plate 806*a* may permit movement of the first diaphragm plate 806*a* upon activation of the speaker 800 including movement along the first path 824*a* and along the central axis 816. Similarly, each of the flexible members associated with the second diaphragm plate 806*b* may permit movement of the second diaphragm plate 806*b* upon activation of the speaker 800 including movement along the second path 824*b* and along the central axis 816.

Each of the flexible members associated with the first diaphragm plate 806*a* may also prevent some movement of the first diaphragm plate 806*a* including a movement away from the central axis 816 and/or displacement of the first diaphragm plate 806*a* along the central axis 816 that is beyond a threshold displacement. The flexible members associated with the first diaphragm plate 806*a* may also cause the first diaphragm plate 806*a* to return to a resting location within the housing 802 when the speaker 800 is no longer activated. Similarly, each of the flexible members associated with the second diaphragm plate 806*b* may also prevent some movement of the second diaphragm plate 806*b* including a movement away from the central axis 816 and/or displacement of the second diaphragm plate 806*b* along the central axis 816 that is beyond a threshold displacement. The flexible members associated with the second diaphragm plate 806*b* may also cause the second diaphragm plate 806*b* to return to a resting location within the housing 802 when the speaker 800 is no longer activated.

In some aspects, the one or more flexible members may each include a flexible member front surface and a flexible member back surface, opposite the flexible member front surface, and that are each perpendicular or nearly perpendicular to the central axis 816 of the housing 802. As shown in FIG. 8, both the first flexible member 808*a* and the second flexible member 808*b* may include a flexible member front surface and a flexible member back surface. For example, with respect to the second flexible member 808*b* (but also similarly applicable to the first flexible member 808*a*), the second flexible member 808*b* includes a flexible member front surface 826 and a flexible member back surface 828. The lesser a cross-sectional surface area of the flexible member front surface 826 and/or the flexible member back surface 828, the greater the amount of surface area that the first front surface 820*a* of the first diaphragm plate 806*a* and/or the first back surface 822*a* of first diaphragm plate 806*a*, the greater amount of cross-sectional surface are the first front surface 820*a* of the first diaphragm plate 806*a* and/or the first back surface 822*a* of the first diaphragm plate 806*a* can occupy across the interior of the cross-section area of the housing 802 to push and/or pull air. Thus, a totaled cross-sectional area of each of the flexible member front surfaces combined of each flexible member of a respective diaphragm plate that occupies a smaller percentage of the interior cross-sectional area of the housing 802 may be more efficient for the speaker 800 to generate sound compared to a totaled cross-sectional area of each of the flexible member front surface combined of each flexible member of a respective diaphragm plate that occupies a larger percentage of the interior cross-sectional area of the housing 802.

In some examples, the first flexible member 808*a* and/or the second flexible member 808*b* may retain the first diaphragm plate 806*a* within the housing 802 so that the position of the first diaphragm plate 806*a* relative to the housing 802 forms a first gap 814*a* between the first diaphragm plate 806*a* and the housing 802. Similarly, the third flexible member and/or the fourth flexible member 808*c* may retain the second diaphragm plate 806*b* within the housing 802 so that the position of the second diaphragm plate 806*b* relative to the housing 802 forms a second gap 814*b* between the second diaphragm plate 806*b* and the housing 802. The first gap 814*a* and the second gap 814*b* allow the first diaphragm plate 806*a* and the second diaphragm plate 806*b* to move within housing 802 without friction between the housing 802 and a respective diaphragm plate. In some aspect, at least one of the first gap 814*a* or the second gap 814*b* may include one or more lubricants to facility movement of the diaphragm plates within the housing 802.

As shown in FIG. 8, the first flexible member 808*a* and/or the second flexible member 808*b* may retain the first diaphragm plate 806*a* within the housing 802 so that the position of the first diaphragm plate 806*a* relative to the housing 802 forms the first gap 814*a* between the first diaphragm plate 806*a* and the top housing plate 802*a*. Similarly, the third flexible member and/or the fourth flexible member 808*c* may retain the second diaphragm plate 806*b* within the housing 802 so that the position of the second diaphragm plate 806*b* relative to the housing 802 forms the second gap 814*b* between the second diaphragm plate 806*b* and the top housing plate 802*a*.

As an alternative to the top housing plate 802*a*, the housing 802 may include a bottom housing plate. In this case, the first flexible member 808*a* and/or the second flexible member 808*b* may retain the first diaphragm plate 806*a* within the housing 802 so that the position of the first diaphragm plate 806*a* relative to the housing 802 forms a gap between the first diaphragm plate 806*a* and the bottom housing plate. In addition, the first flexible member 808*a* and/or the second flexible member 808*b* may maintain the gap between the first diaphragm plate 806*a* and the housing 802 so that as the first diaphragm plate 806*a* moves to push and/or pull air to generate sound, the first diaphragm plate 806*a* may move smoothly within the housing 802. Similarly, the third flexible member and/or the fourth flexible member 808*c* may retain the second diaphragm plate 806*b* within the housing 802 so that the position of the second diaphragm plate 806*b* relative to the housing 802 forms a gap between the second diaphragm plate 806*b* and the bottom housing plate. In addition, the third flexible member and/or the fourth flexible member 808*c* may maintain the gap between the second diaphragm plate 806*b* and the housing 802 so that as the second diaphragm plate 806*b* moves to push and/or pull air to generate sound, the second diaphragm plate 806*b* may move smoothly within the housing 802.

As described herein, each of the diaphragm plates may include one or more driving devices. For example, the first diaphragm plate 806*a* may include a driving device 812. As described and illustrated herein, each of the diaphragm plates may include one or more driving devices forming a portion of a front surface of the diaphragm plate (e.g., perpendicular to the central axis 816) and/or one or more driving device forming a portion of a back surface of the diaphragm plate (e.g., perpendicular to the central axis 816). In some aspects, one or more of the driving devices may be a magnetic circuit, a permanent magnet, a transducer, or the like. Additionally, or alternatively, one or more of the driving devices may be an electric circuit, an electric coil, or a coil insert. Also as described herein, each insert plate (e.g., insert plate 804) may include one or more insert plate driving devices aligned with and facing a driving device positioned on a diaphragm plate. In some aspects, one or more of the insert plate driving devices may be an electric circuit, an electric coil, or a coil insert, or the like. Additionally, or alternatively, one or more of the insert plate driving devices may be a magnetic circuit, a permanent magnet, a transducer, or the like. When a driving device is at least one of a magnetic circuit, a permanent magnet, a transducer, or the like, the driving device may align with an insert plate driving device that is at least one of an electric circuit, an electric coil, or a coil insert, or the like. In this case, when the speaker (e.g., the speaker 800) is not in an active state, the insert plate driving device may rest in a recess of the driving device. Conversely, when a driving device is at least one of an electric circuit, an electric coil, or a coil insert, or the like, the driving device may align with an insert plate driving device that is at least one of a magnetic circuit, a permanent magnet, a transducer, or the like. In this case, when the speaker (e.g., the speaker 800) is not in an active state, the driving device may rest in a recess of the insert plate driving device.

Upon activation of the speaker 800, at least one of the first diaphragm plate 806*a* or the second diaphragm plate 806*b* may move or oscillate along the central axis 816. When either the first diaphragm plate 806*a* or the second diaphragm plate 806*b* move away from the insert plate 804, an aperture 830 exposed to an ambient environment 832 may draw air into the space between the first diaphragm plate 806*a* and the insert plate 804 and/or the space between the second diaphragm plate 806*b* and the insert plate 804 generating sound. Conversely, when either the first diaphragm plate 806*a* or the second diaphragm plate 806*b* move towards the insert plate 804, the aperture 830 exposed to the ambient environment 832 may receive air from the space between the first diaphragm plate 806*a* and the insert plate 804 and/or the space between the second diaphragm plate 806*b* and the insert plate 804 generating sound. It should be understood that each of the individual driving devices and/or insert plate driving devices may either collectively receive or collectively receive an electric current. Thus, each of the first diaphragm plate 806*a* and the second diaphragm plate 806*b* may move independently and/or in unison. For example, each of the first diaphragm plate 806*a* and the second diaphragm plate 806*b* may move together at least at one of a same speed, a same direction, a same tempo, or a same acceleration to generate one or more same or similar sounds. As another example, each of the first diaphragm plate 806*a* and the second diaphragm plate 806*b* may move independently of each other with respect to at least one of a different speed, a different direction, a different tempo, or a different acceleration to generate one or more different sounds.

Figure 9:
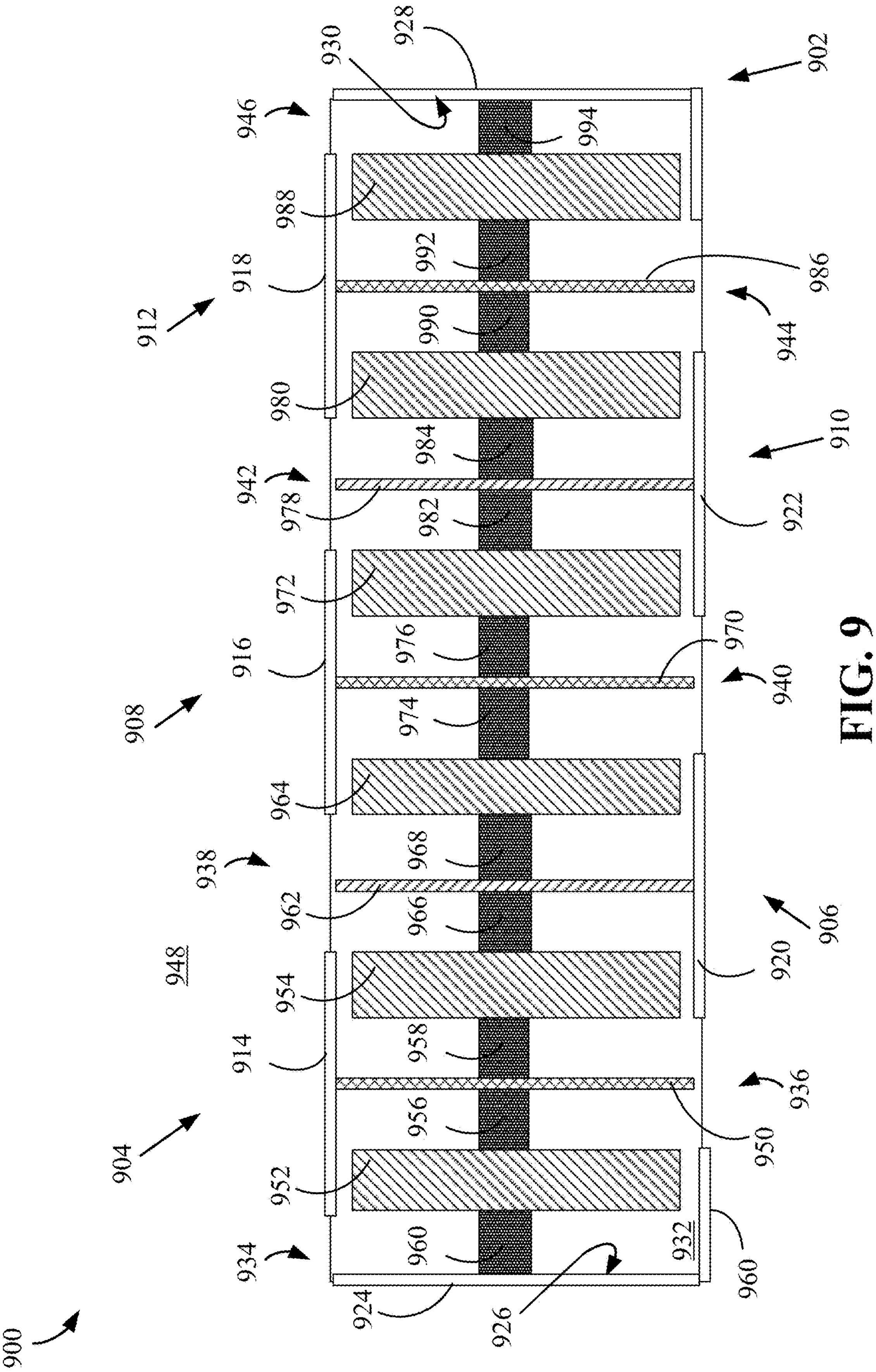
FIG. 9 is a perspective side view of a cross-section of a speaker unit according to some aspects.

FIG. 9 is a perspective side view of a cross-section of a speaker unit 900 according to some aspects. The speaker unit 900 may include one or more features illustrated in and described with respect to FIGS. 1A, 1B, 2, 3, 4, 5, 6, 7, and 8. The speaker unit 900 may include a housing 902. As shown in FIG. 9, the housing 902 may include one or more top plates including a first top plate 914, a second top plate 916, and a third top plate 918. The housing 902 may also include one or more bottom plates including a first bottom plate 920 and a second bottom plate 922. The housing may further include a first end plate 924 with a first interior surface 926 and a second end plate 928 with a second interior surface 930. The housing 902 may also include a side interior surface 932. It should be understood that while the housing 902 of the speaker unit 900 and one or more other components of the speaker unit 900 illustrated in FIG. 9 may have a rectangular shape, the housing 902 of the speaker unit 900 and the one or more components of the speaker unit 900 may have a triangular shape, a circular shape, an elliptical shape, and/or any other polygonal shape. In some aspects, the housing 902 may include one or more apertures. For example, the housing 902 may include a first aperture 934, a second aperture 936, a third aperture 938, a fourth aperture 940, a fifth aperture 942, a sixth aperture 944, and a seventh aperture 946. Each of the apertures are configured to communicate fluid (e.g., air) between the interior of the housing 902 and an ambient environment 948. In some aspects, each of the apertures may be configured at a 90-degree angle relative to a central axis of the housing 902 and/or a front surface or a back surface of a diaphragm plate so that when air is pushed out of the housing 902 and/or pulled into the housing 902 by one or more diaphragm plates, sound is directed out of the housing 902 at a 90-degree angle relative to a central axis of the housing 902 and/or relative to a front surface or a back surface of a diaphragm plate. The speaker unit 900 may also include one or more speakers. For example, as shown in FIG. 9, the one or more speakers may include a first speaker 904, a second speaker 906, a third speaker 908, a fourth speaker 910, and a fifth speaker 912. Each of the first speaker 904, the second speaker 906, the third speaker 908, the fourth speaker 910, and the fifth speaker 912 may include one or more features of the speaker 800 illustrated in FIG. 8.

With respect to the first speaker 904 and as similarly described herein, the first speaker 904 may include a first insert plate 950 fixedly attached to an interior surface of the first top plate 914, a first diaphragm plate 952 positioned adjacent a first side of the first insert plate 950, and a second diaphragm plate 954 positioned adjacent a second side of the first insert plate 950 opposite the first side of the first insert plate 950. The first diaphragm plate 952 may be driven by a first driving device coupling 956. The first driving device coupling 956 may include a first driving device of the first diaphragm plate 952 coupled to a first insert plate driving device of the first insert plate 950. Similarly, the second diaphragm plate 954 may be driven by a second driving device coupling 958. The second driving device coupling 958 may include a second driving device of the second diaphragm plate 954 coupled to a second insert plate driving device of the first insert plate 950. In some aspects, the first diaphragm plate 952 may be driven by a third driving device coupling 960. The third driving device coupling 960 may include a third driving device of the first diaphragm plate 952 coupled to an insert plate driving device of the first interior surface 926 of the housing 902.

With respect to the second speaker 906 and as similarly described herein, the second speaker 906 may include a second insert plate 962 fixedly attached to an interior surface of the first bottom plate 920, the second diaphragm plate 954 positioned adjacent a first side of the second insert plate 962, and a third diaphragm plate 964 positioned adjacent a second side of the second insert plate 962 opposite the first side of the second insert plate 962. In addition to, or as an alternative to, the second diaphragm plate 954 being driven by the second driving device coupling 958, the second diaphragm plate 954 may be driven by a fourth driving device coupling 966. The fourth driving device coupling 966 may include a fourth driving device of the second diaphragm plate 954 coupled to a fourth insert plate driving device of the second insert plate 962. The third diaphragm plate 964 being driven by a fifth driving device coupling 968. The fifth driving device coupling 968 may include a fifth driving device of the third diaphragm plate 964 coupled to a fifth insert plate driving device of the second insert plate 962.

When the first diaphragm plate 952 is driven by at least one of the first driving device coupling 956 or the third driving device coupling 960 toward the first interior surface 926 of the first end plate 924 and away from the first insert plate 950, the first diaphragm plate 952 may push air out of the housing 920 through the first aperture 934 and pull air into the housing 920 through the second aperture 936. Pushing and pulling of the air by the first diaphragm plate may cause the speaker unit 900 to generate one or more sounds. Conversely, when the first diaphragm plate 952 is driven by at least one of the first driving device coupling 956 or the third driving device coupling 960 away from the first interior surface 926 of the first end plate 924 and towards the first insert plate 950, the first diaphragm plate 952 may pull air into the housing 920 through the first aperture 934 and push air out of the housing 920 through the second aperture 936.

Similarly, when the second diaphragm plate 954 is driven by at least one of the second driving device coupling 958 or the fourth driving device coupling 966 toward the first insert plate 950 and away from the second insert plate 962, the second diaphragm plate 954 may push air out of the housing 920 through the second aperture 936 and pull air into the housing 920 through the third aperture 938. Similarly, pushing and pulling of the air by the second diaphragm plate may also cause the speaker unit 900 to generate one or more sounds. Conversely, when the second diaphragm plate 954 is driven by at least one of the second driving device coupling 958 or the fourth driving device coupling 966 away from the first insert plate 950 and towards the second insert plate 962, the second diaphragm plate 954 may pull air into the housing 920 through the second aperture 936 and push air out of the housing 920 through the third aperture 938.

With respect to the third speaker 908 and as similarly described herein, the third speaker 908 may include a third insert plate 970 fixedly attached to an interior surface of the second top plate 916, the third diaphragm plate 964 positioned adjacent a first side of the third insert plate 970, and a fourth diaphragm plate 972 positioned adjacent a second side of the third insert plate 970 opposite the first side of the third insert plate 970. In addition to, or as an alternative to the third diaphragm plate 964 being driven by the fifth driving device coupling 968, the third diaphragm plate 964 may be driven by a sixth driving device coupling 974. The sixth driving device coupling 974 may include a sixth driving device of the third diaphragm plate 964 coupled to a sixth insert plate driving device of the third insert plate 970. Similarly, the fourth diaphragm plate 971 may be driven by a seventh driving device coupling 976. The seventh driving device coupling 976 may include a seventh driving device of the fourth diaphragm plate 972 coupled to a seventh insert plate driving device of the third insert plate 970.

With respect to the fourth speaker 910 and as similarly described herein, the fourth speaker 910 may include a fourth insert plate 978 fixedly attached to an interior surface of the second bottom plate 922, the fourth diaphragm plate 972 positioned adjacent a first side of the fourth insert plate 978, and a fifth diaphragm plate 980 positioned adjacent a second side of the fourth insert plate 978 opposite the first side of the fourth insert plate 978. In addition to, or as an alternative to, the fourth diaphragm plate 972 being driven by the seventh driving device coupling 976, the fourth diaphragm plate 972 may be driven by an eighth driving device coupling 982. The eighth driving device coupling 982 may include an eighth driving device of the fourth diaphragm plate 972 coupled to an eighth insert plate driving device of the fourth insert plate 978. The fifth diaphragm plate 980 being driven by a ninth driving device coupling 984. The ninth driving device coupling 984 may include a ninth driving device of the fifth diaphragm plate 980 coupled to a ninth insert plate driving device of the fourth insert plate 978.

When the third diaphragm plate 964 is driven by at least one of the fifth driving device coupling 968 or the sixth driving device coupling 974 toward the second insert plate 962 and away from the third insert plate 970, the third diaphragm plate 964 may push air out of the housing 920 through the third aperture 938 and pull air into the housing 920 through the fourth aperture 940. Pushing and pulling of the air by the third diaphragm plate 964 may cause the speaker unit 900 to generate one or more sounds. Conversely, when the third diaphragm plate 964 is driven by at least one of the fifth driving device coupling 968 or the sixth driving device coupling 974 away from the second insert plate 962 and towards the third insert plate 970, the third diaphragm plate 964 may pull air into the housing 920 through the third aperture 938 and push air out of the housing 920 through the fourth aperture 940.

Similarly, when the fourth diaphragm plate 972 is driven by at least one of the seventh driving device coupling 976 or the eighth driving device coupling 982 toward the third insert plate 970 and away from the fourth insert plate 978, the fourth diaphragm plate 972 may push air out of the housing 920 through the fourth aperture 940 and pull air into the housing 920 through the fifth aperture 942. Similarly, pushing and pulling of the air by the second diaphragm plate may also cause the speaker unit 900 to generate one or more sounds. Conversely, when the fourth diaphragm plate 972 is driven by at least one of the seventh driving device coupling 976 or the eighth driving device coupling 982 away from the third insert plate 970 and towards the fourth insert plate 978, the fourth diaphragm plate 972 may pull air into the housing 920 through the fourth aperture 940 and push air out of the housing 920 through the fifth aperture 942.

With respect to the fifth speaker 912 and as similarly described herein, the fifth speaker 912 may include a fifth insert plate 986 fixedly attached to an interior surface of the third top plate 918, the fifth diaphragm plate 980 positioned adjacent a first side of the fifth insert plate 986, and a sixth diaphragm plate 988 positioned adjacent a second side of the fifth insert plate 986 opposite the first side of the fifth insert plate 986. In addition to, or as an alternative to the fifth diaphragm plate 980 being driven by the ninth driving device coupling 984, the fifth diaphragm plate 980 may be driven by a tenth driving device coupling 990. The tenth driving device coupling 990 may include a tenth driving device of the fifth diaphragm plate 980 coupled to a tenth insert plate driving device of the fifth insert plate 986. Similarly, the sixth diaphragm plate 988 may be driven by an eleventh driving device coupling 992. The eleventh driving device coupling 992 may include an eleventh driving device of the sixth diaphragm plate 988 coupled to an eleventh insert plate driving device of the fifth insert plate 986. In some aspects, the sixth diaphragm plate 988 may be driven by a twelfth driving device coupling 994. The twelfth driving device coupling 994 may include a twelfth driving device of the sixth diaphragm plate 988 coupled to an insert plate driving device of the second interior surface 930 of the second end plate 928 of the housing 902.

When the fifth diaphragm plate 980 is driven by at least one of the ninth driving device coupling 984 or the tenth driving device coupling 990 toward the fourth insert plate 978 and away from the fifth insert plate 986, the fifth diaphragm plate 998 may push air out of the housing 920 through the fifth aperture 942 and pull air into the housing 920 through the sixth aperture 944. Pushing and pulling of the air by the fifth diaphragm plate 980 may cause the speaker unit 900 to generate one or more sounds. Conversely, when the fifth diaphragm plate 980 is driven by at least one of the ninth driving device coupling 984 or the tenth driving device coupling 990 away from the fourth insert plate 9978 and towards the fifth insert plate 986, the fifth diaphragm plate 998 may pull air into the housing 920 through the fifth aperture 942 and push air out of the housing 920 through the sixth aperture 944.

Similarly, when the sixth diaphragm plate 988 is driven by at least one of the eleventh driving device coupling 992 or the twelfth driving device coupling 994 toward the fifth insert plate 986 and away from the second interior surface 930 of the second end plate 928 of the housing 902, the sixth diaphragm plate 988 may push air out of the housing 920 through the sixth aperture 944 and pull air into the housing 920 through the seventh aperture 946. Similarly, pushing and pulling of the air by the sixth diaphragm plate 988 may also cause the speaker unit 900 to generate one or more sounds. Conversely, when the sixth diaphragm plate 988 is driven by at least one of the eleventh driving device coupling 992 or the twelfth driving device coupling 994 away from the fifth insert plate 986 and towards the second interior surface 930 of the second end plate 928 of the housing 902, the sixth diaphragm plate 988 may pull air into the housing 920 through the sixth aperture 944 and push air out of the housing 920 through the seventh aperture 946.

It should be understood that each of the diaphragm plates of the speaker unit 900 may either collectively move together to generate one or more same or similar sounds or move independently to generate one or more different sounds. For example, each of the diaphragm plates of the speaker unit 900 may move together at least at one of a same speed, a same direction, a same tempo, or a same acceleration to generate one or more same or similar sounds. As another example, each of the diaphragm plates of the speaker unit 900 may move independently of each other with respect to at least one of a different speed, a different direction, a different tempo, or a different acceleration to generate one or more different sounds. Further, it should be understood that while each of the driving device couplings illustrate one driving device coupling on either side of the insert plates, each of these driving device couplings may represent one or more driving device couplings on either side of the insert plates. Similarly, it should be understood that while each of the driving device couplings illustrate one driving device coupling on the interior surfaces 926 and 930 of the housing 902 at the first end plate 924 and the second end plate 928, respectively, each of these driving device couplings may represent one or more driving device couplings. Additionally, the configuration of the speaker unit 900 may place a plurality of driving device couplings in parallel with each so that when an electric current drives one or more driving device couplings to move one or more diaphragm plates, a reduction in power may be achieved to drive the driving device couplings to move the diaphragm plates. A reduction in power usage may be desirable for inserting the speaker unit 900 in a small electronic device including a handset or a mobile cellular device.

Figure 10:
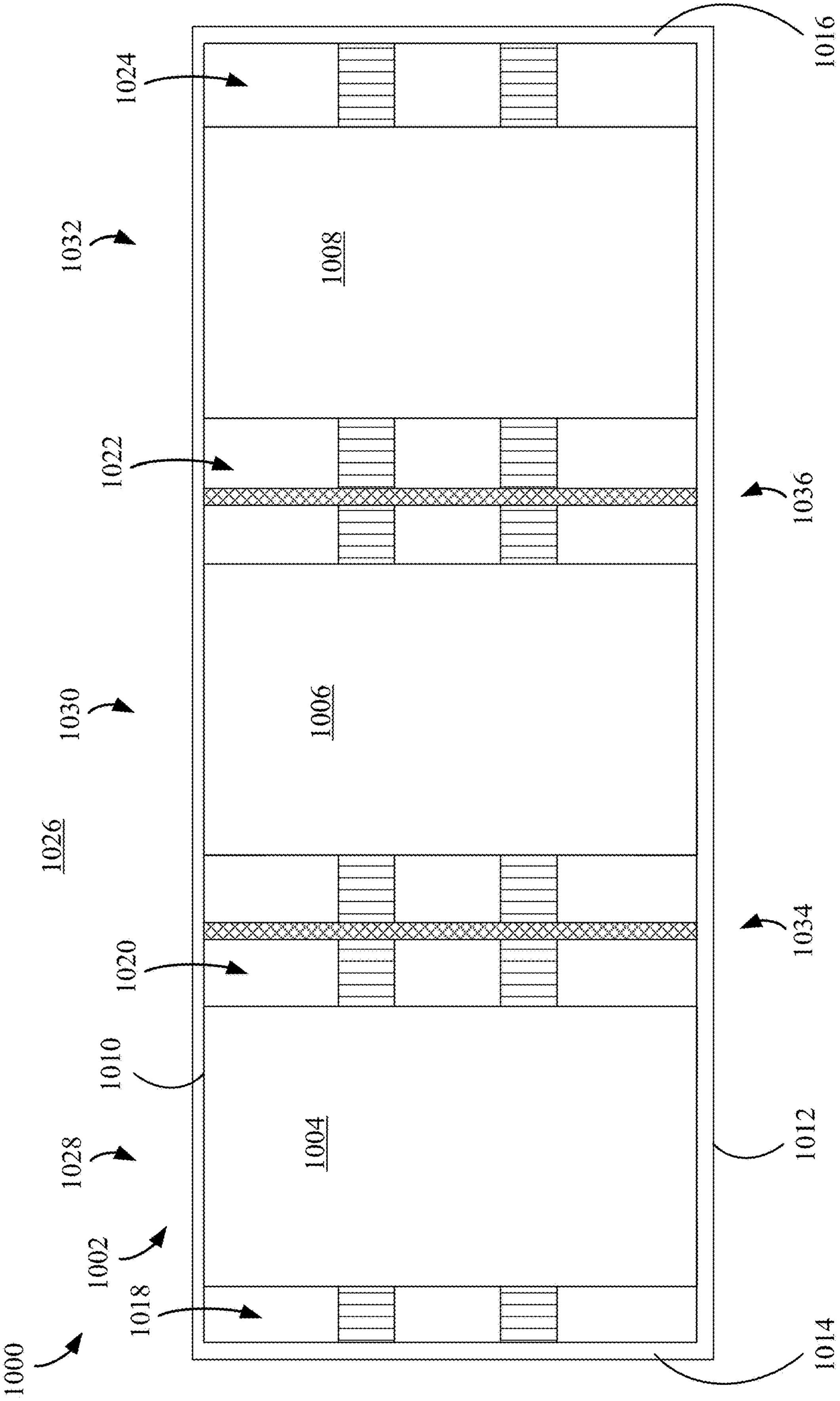
FIG. 10 is a perspective top view of a speaker unit according to some aspects.

FIG. 10 is a perspective top view of a speaker unit 1000 according to some aspects. The speaker unit 1000 may include one or more features illustrated in and described with respect to FIGS. 1A, 1B, 2, 3, 4, 5, 6, 7, 8, and 9 and may include one or more features of the speaker unit 900 illustrated in FIG. 9. The speaker unit 1000 may include a housing 1002. As shown in FIG. 10, the housing 1002 may include one or more top plates including a first top plate 1004, a second top plate 1006, and a third top plate 1008. The housing may further include a first side plate 1010, a second side plate 1012, a first end plate 1014, and a second end plate 1016. It should be understood that while the housing 1002 of the speaker unit 1000 and one or more other components of the speaker unit 1000 illustrated in FIG. 10 may have a rectangular shape, the housing 1002 of the speaker unit 1000 and the one or more components of the speaker unit 1000 may have a triangular shape, a circular shape, an elliptical shape, and/or any other polygonal shape.

In some aspects, the housing 1002 may include one or more apertures. For example, the housing 1002 may include a first aperture 1018, a second aperture 1020, a third aperture 1022, and a fourth aperture 1024. Each of the apertures are configured to communicate fluid (e.g., air) between the interior of the housing 1002 and an ambient environment 1026. In some aspects, each of the apertures may be configured at a 90-degree angle relative to a central axis of the housing 1002 and/or a front surface or a back surface of a diaphragm plate so that when air is pushed out of the housing 1002 and/or pulled into the housing 1002 by one or more diaphragm plates, sound is directed out of the housing 1002 at a 90-degree angle relative to a central axis of the housing 1002 and/or relative to a front surface or a back surface of a diaphragm plate. The speaker unit 1000 may also include one or more speakers. For example, as shown in FIG. 10, the one or more speakers may include a first speaker 1028, a second speaker 1030, and a third speaker 1032, each housed beneath the first top plate 1004, the second top plate 1006, and the third top plate 1008, respectively. The one or more speakers of the speaker unit 100 may also include a fourth speaker 1034 and a fifth speaker 1036 positioned beneath the second aperture 1020 and the third aperture 1022, respectively. Each of the first speaker 1028, the second speaker 1030, the third speaker 1032, the fourth speaker 1034, and the fifth speaker 1036 may include one or more features of the speaker 800 illustrated in FIG. 8 and/or one or more features of the first speaker 904, the second speaker 906, the third speaker 908, the fourth speaker 910, and/or the fifth speaker 912 illustrated in FIG. 9.

Any one or more of the speaker 200 of FIG. 2, the speaker 800 of FIG. 8, the speaker system 900 of FIG. 9, and the speaker system 1000 of FIG. 10 may increase the interaction between the diaphragm plate and the air by increasing the air-load of the diaphragm plate while using the slit or gaps around portions of the perimeter of the diaphragm plate where the flexible members are not present to improve the effective radiation area of the diaphragm plate. In some aspects, when the diaphragm plates and/or the insert plates include multiple driving devices and correlating insert plate driving devices, the diaphragm plates can be moved with greater force and control compared to diaphragm plates and inserts plates with only one driving device and correlating insert plate driving device. The configuration of multiple speakers within the speaker system may provide the speaker system with a compact configuration improving the speaker system's electroacoustic efficiency and sound pressure levels.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to a stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A speaker comprising:

a housing;

a first diaphragm plate positioned within the housing and without an opening at the first diaphragm plate into an interior of the housing and comprising a first driving device forming an exterior surface of the first diaphragm plate;

a second diaphragm plate positioned within the housing and without an opening at the second diaphragm plate into the interior of the housing and comprising a second driving device forming an exterior surface of the second diaphragm plate;

an insert plate fixedly attached to the housing and positioned between the first diaphragm plate and the second diaphragm plate, wherein the insert plate comprises an insert plate driving device positioned adjacent the first driving device and the second driving device, and wherein the insert plate driving device includes:

a first insert plate driving device configured to interact with the first driving device to move the first diaphragm plate relative to the housing, and a second insert plate driving device configured to interact with the second driving device to move the second diaphragm plate relative to the housing; and a first aperture extending at a first surface of the housing over a first space between the first diaphragm plate and the insert plate, the insert plate, and a second space between the second diaphragm plate and the insert plate, the first aperture configured to enable air flow between the first space and an exterior of the housing and between the second space and the exterior of the housing, wherein the first driving device includes a first recess for receiving the first insert plate driving device to rest the first insert plate driving device in the first recess and the second driving device includes a second recess for receiving the second insert plate driving device to rest the second insert plate driving device in the second recess, and wherein the first insert plate driving device rests in the first recess when the first driving device is not moved by the first insert plate deriving device and the first insert plate driving device does not rest in the first recess when the first driving device is moved by the first insert plate deriving device interacting with the first driving device, and wherein the second insert plate driving device rests in the second recess when the second driving device is not moved by the second insert plate deriving device and the second insert plate driving device does not rest in the second recess when the second driving device is moved by the second insert plate deriving device interacting with the second driving device.

2. The speaker of claim 1, wherein:

the first driving device comprises a first transducer;

the second driving device comprises a second transducer; and the insert plate driving device comprises a coil insert.

3. The speaker of claim 2, wherein, in response to receiving an electrical current, the coil insert is configured to interact with at least one of the first transducer to move the first diaphragm plate relative to the housing or the second transducer to move the second diaphragm plate relative to the housing.

4. The speaker of claim 1, wherein:

the first driving device comprises a first coil insert;

the second driving device comprises a second coil insert; and the insert plate driving device comprises a transducer.

5. The speaker of claim 4, wherein, in response to receiving an electrical current, the first coil insert is configured to interact with the transducer to move the first diaphragm plate relative to the housing.

6. The speaker of claim 4, wherein, in response to receiving an electrical current, the second coil insert is configured to interact with the transducer to move the second diaphragm plate relative to the housing in response to receiving the electrical current.

7. The speaker of claim 1, wherein the first aperture is positioned through the first surface of the housing and in fluid communication with each of the first diaphragm plate, the second diaphragm plate, and insert plate, and wherein the housing further comprises:

a second aperture positioned through a second surface of the housing and in fluid communication with first diaphragm plate; and a third aperture positioned through the second surface of the housing and in fluid communication with the second diaphragm plate.

8. The speaker of claim 7, wherein the first surface of the housing and the second surface of the housing comprise parallel surfaces.

9. A speaker comprising:

a rectangular housing;

a diaphragm plate comprising a driving device forming an exterior surface of the diaphragm plate;

a first flexible member separate from the diaphragm plate and flexibly coupled to a first end of the diaphragm plate at one side of the first flexible member and to a first interior surface of the rectangular housing at another side of the first flexible member;

a second flexible member separate from the diaphragm plate and flexibly coupled to a second end of the diaphragm plate at one end of the second flexible member and to a second interior surface of the rectangular housing at another side of the second flexible member, wherein the first interior surface of the rectangular housing faces the second interior surface of the rectangular housing at another side of the first flexible member, the second flexible member being separate from the first flexible member; and an insert plate fixedly attached to the rectangular housing, wherein the insert plate comprises an insert plate driving device positioned adjacent the driving device and configured to cause the diaphragm plate to move relative to the rectangular housing in response to at least one of the driving device or the insert plate driving device receiving an electrical current, wherein the diaphragm plate is flexibly coupled to the rectangular housing via the first flexible member and the second flexible member to enable a movement of the diaphragm plate relative to the rectangular housing, wherein the driving device includes a recess for receiving the insert plate driving device to rest the insert plate driving device in the recess, and wherein the insert plate driving device rests in the recess when the driving device is not moved by the insert plate driving device, and the insert plate driving device does not rest in the recess when the driving device is moved by the insert plate deriving device interacting with the driving device.

10. The speaker of claim 9, wherein the driving device comprises a transducer and the insert plate driving device comprises a coil, and wherein the coil is configured to cause the diaphragm plate to move relative to the rectangular housing in response to receiving the electrical current.

11. The speaker of claim 9, wherein the driving device comprises a coil and the insert plate driving device comprises a transducer, and wherein the coil is configured to cause the diaphragm plate to move relative to the rectangular housing in response to receiving the electrical current.

12. The speaker of claim 9, wherein the first flexible member coupled to the first interior surface and the second flexible member coupled to the second interior surface are each configured to permit movement of the diaphragm plate along a direction parallel with the first interior surface the second interior surface.

13. The speaker of claim 9, wherein the first flexible member coupled to the first interior surface and the second flexible member coupled to the second interior surface are each configured to dampen movement of the diaphragm plate along one or more directions that are not parallel to the first interior surface and the second interior surface.

14. A speaker comprising:

a housing;

a diaphragm plate having a front face, a back face, and a perimeter face, the diaphragm plate comprising:

a first length of the perimeter face positioned adjacent a first section of an interior surface of the housing and flexibly coupled to the first section of the interior surface of the housing via a first flexible member separate from the diaphragm plate and coupled to the diaphragm plate to enable a movement of the diaphragm plate relative to the housing, a second length of the perimeter face positioned adjacent a second section of the interior surface of the housing and separated from the second section of the interior surface of the housing via a gap, and a third length of the perimeter face positioned adjacent a third section of an interior surface of the housing and flexibly coupled to the third section of the interior surface of the housing via a second flexible member separate from the diaphragm plate and coupled to the diaphragm plate to enable the movement of the diaphragm plate relative to the housing, the second flexible member being separate from the first flexible member;

a driving device forming an exterior surface of the diaphragm plate; and an insert plate fixedly attached to the housing, wherein the insert plate comprises an insert plate driving device positioned adjacent the driving device and configured to cause the diaphragm plate to move relative to the housing in response to at least one of the driving device or the insert plate driving receiving an electrical current, wherein the driving device includes a recess for receiving the insert plate driving device to rest the insert plate driving device in the recess, and wherein the insert plate driving device rests in the recess when the driving device is not moved by the insert plate driving device, and the insert plate driving device does not rest in the recess when the driving device is moved by the insert plate deriving device interacting with the driving device.

15. The speaker of claim 14, wherein the diaphragm plate further comprises:

a fourth length of the perimeter face positioned adjacent a fourth section of the interior surface of the housing and separated from the fourth section of the interior surface of the housing via another gap.

16. The speaker of claim 15, wherein the first length of the perimeter face, the second length of the perimeter face, the third length of the perimeter face, and the fourth length of the perimeter face comprise an entire length of the perimeter face.

17. The speaker of claim 14, wherein:

the housing comprises a rectangular housing; and the front face and the back face of the diaphragm plate comprise a rectangle shape.

18. The speaker of claim 14, wherein the driving device comprises a transducer and the insert plate driving device comprises a coil, and wherein the coil is configured to cause the diaphragm plate to move relative to the housing in response to receiving the electrical current.

19. The speaker of claim 14, wherein the driving device comprises a coil and the insert plate driving device comprises a transducer, and wherein the coil is configured to cause the diaphragm plate to move relative to the housing in response to receiving the electrical current.

20. The speaker of claim 14, wherein the first flexible member coupling the first length of the perimeter face of the diaphragm plate to the first section of the interior surface of the housing is configured to permit movement of the diaphragm plate along a direction parallel with the interior surface of the housing.

* * * * *